(12) United States Patent
Döge et al.

(10) Patent No.: US 11,287,247 B2
(45) Date of Patent: Mar. 29, 2022

(54) APPARATUS FOR THREE-DIMENSIONAL MEASUREMENT OF AN OBJECT, METHOD AND COMPUTER PROGRAM

(71) Applicant: Fraunhofer-Gesellschaft zur Förderung der angewandten Forschung e.V., Munich (DE)

(72) Inventors: Jens Döge, Dresden (DE); Christoph Hoppe, Dresden (DE); Willi Neudeck, Dresden (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 16/137,269

(22) Filed: Sep. 20, 2018

(65) Prior Publication Data

US 2019/0033068 A1 Jan. 31, 2019

Related U.S. Application Data

(63) Continuation of application No. PCT/EP2017/056884, filed on Mar. 22, 2017.

(30) Foreign Application Priority Data

Mar. 22, 2016 (EP) ..................................... 16161794

(51) Int. Cl.
*G01B 11/25* (2006.01)
*G01B 11/245* (2006.01)
(Continued)

(52) U.S. Cl.
CPC ........ *G01B 11/2518* (2013.01); *G01B 11/245* (2013.01); *G01S 17/48* (2013.01);
(Continued)

(58) Field of Classification Search
CPC ... G01B 11/245; G01B 11/2518; G01S 17/48; G01S 17/89; G06T 7/521; G06T 7/579; H04N 13/221
See application file for complete search history.

(56) References Cited

U.S. PATENT DOCUMENTS 4,798,964 A 1/1989 Schmalfuss et al.
7,525,669 B1 4/2009 Abdollahi
(Continued)

FOREIGN PATENT DOCUMENTS

EP 0228500 A2 7/1987
EP 3163252 A1 5/2017
(Continued)

OTHER PUBLICATIONS

Japanese language office action dated Oct. 29, 2019, issued in application No. JP 2018-550467, and its translation.
(Continued)

*Primary Examiner* — Violeta A Prieto
(74) *Attorney, Agent, or Firm* — McClure, Qualey & Rodack, LLP

(57) ABSTRACT

An apparatus for three-dimensional measurement of an object includes a positioning unit that is configured to receive information showing intersections of a projected line with a plurality of lines of predetermined or known position and to determine a position of the projected line based on the received image information. Further, the respective method and the respective computer program are described.

34 Claims, 8 Drawing Sheets

(51) Int. Cl.
*G01S 17/48* (2006.01)
*G06T 7/521* (2017.01)
*G06T 7/579* (2017.01)
*H04N 13/221* (2018.01)

(52) U.S. Cl.
CPC .............. *G06T 7/521* (2017.01); *G06T 7/579* (2017.01); *H04N 13/221* (2018.05)

(56) References Cited

U.S. PATENT DOCUMENTS

| | | | |
|---|---|---|---|
| 7,545,516 | B2 | 6/2009 | Jia et al. |
| 10,580,123 | B2 * | 3/2020 | Doge ................ G01B 11/2518 |
| 11,014,163 | B2 * | 5/2021 | Preston ................ B33Y 50/02 |
| 2003/0024481 | A1 | 2/2003 | Kalscheur et al. |
| 2005/0068523 | A1 | 3/2005 | Wang et al. |
| 2005/0231734 | A1 | 10/2005 | Johannesson |
| 2008/0204763 | A1 | 8/2008 | Turbell et al. |
| 2008/0266391 | A1 | 10/2008 | Lee et al. |
| 2009/0040532 | A1 | 2/2009 | Kawasaki et al. |
| 2011/0110572 | A1 | 5/2011 | Guehring et al. |
| 2014/0029018 | A1 | 1/2014 | Freitag et al. |
| 2014/0240464 | A1 | 8/2014 | Lee |
| 2014/0285658 | A1 | 9/2014 | Mian et al. |
| 2015/0022637 | A1 | 1/2015 | Saeki |
| 2015/0109423 | A1 | 4/2015 | Shimodaira |
| 2017/0248525 | A1 | 8/2017 | Mayumi |
| 2017/0350956 | A1 * | 12/2017 | Karlov ...................... G01S 5/16 |
| 2018/0297113 | A1 * | 10/2018 | Preston ................ B29C 64/165 |
| 2018/0347970 | A1 | 12/2018 | Sasaki |
| 2018/0348144 | A1 | 12/2018 | Ando |
| 2018/0352163 | A1 | 12/2018 | Ando |
| 2019/0025049 | A1 * | 1/2019 | Doge ...................... G01S 17/48 |
| 2019/0026877 | A1 * | 1/2019 | Doge ................ G01B 11/2513 |
| 2019/0033068 | A1 | 1/2019 | Döge et al. |

FOREIGN PATENT DOCUMENTS

| | | |
|---|---|---|
| JP | H04-301751 A | 10/1992 |
| JP | H08-029135 A | 2/1996 |
| JP | H08-094313 A | 4/1996 |
| JP | H08-304040 A | 11/1996 |
| JP | 2002225237 A | 8/2002 |
| JP | 2012-103266 A | 5/2012 |
| JP | 2012-122893 A | 6/2012 |
| JP | 2014-095627 A | 5/2014 |

OTHER PUBLICATIONS

International Search Report issued in PCT/EP2017/056884 dated May 31, 2017.
Non-Final Office Action issued in U.S. Appl. No. 16/137,701, filed Sep. 21, 2018, dated Sep. 22, 2021 (copy not provided).
Japanese Office Action dated Aug. 4, 2020, in application No. 2018-550467.

* cited by examiner

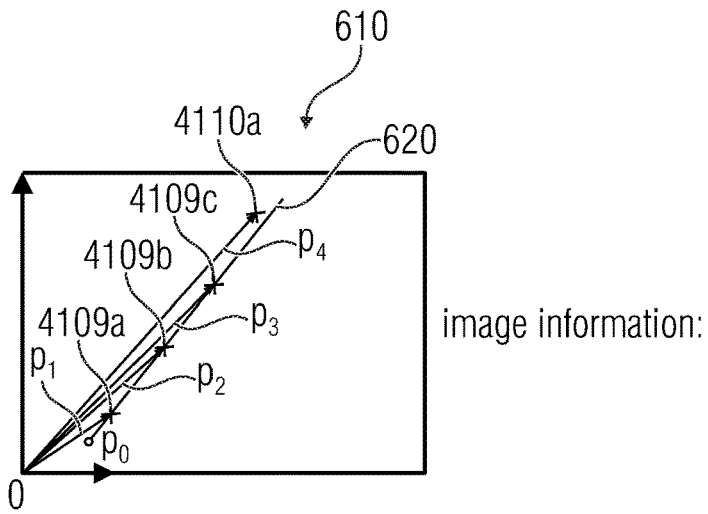

| | |
|---|---|
| $p_1, p_2, p_3, p_4$ (generally: $p_i$) | : coordinates of the interface in the coordinate system of the image information known |

⇩

| | |
|---|---|
| s | : direction of the (regression) line through the intersections in the coordinate system of the image information determined |

⇩

| | |
|---|---|
| $p_0$ | : coordinate origin of the (regression) line through the intersections in the coordinate system of the image information selected |

⇩

| | |
|---|---|
| $k_i$ | : parameter of the intersections based on $p_i = p_0 + k_i s$ or $p_i \approx p_0 + k_i s$ determined |

⇩ determination of the position of $P_0$ and the direction of s in the coordinate system of the lines of predetermined or known position

Fig. 6

APPARATUS FOR THREE-DIMENSIONAL MEASUREMENT OF AN OBJECT, METHOD AND COMPUTER PROGRAM

CROSS-REFERENCE TO RELATED APPLICATIONS

This application is a continuation of copending International Application No. PCT/EP2017/056884, filed Mar. 22, 2017, which is incorporated herein by reference in its entirety, and additionally claims priority from European Application No. 16161794.9, filed Mar. 22, 2016, which is also incorporated herein by reference in its entirety.

Embodiments according to the present invention relate to an apparatus for three-dimensional measurement of an object.

Further embodiments according to the present invention relate to a method for three-dimensional measurement of an object.

Further embodiments according to the invention relate to a computer program for performing a method for three-dimensional measurement of an object.

Further embodiments relate to a method and an apparatus for automatic positioning in three-dimensional (3D) measurement by means of laser light section triangulation.

BACKGROUND OF THE INVENTION

Currently, in many technical fields, there is the desire for obtaining a three-dimensional image of a really existing object. For example, sometimes it is desirable to produce a digital model of an object for generating an animation. Alternatively, it is also sometimes desirable to copy an object for example by using a three-dimensional print.

It has been shown that a three-dimensional image of an object can be obtained, for example, by a laser light section scan.

Thus, there is, for example, a structure of a three-dimensional measurement system with laser light section triangulation. In conventional concepts, advance takes place selectively for the measurement object or for the sensor head. The sensor head consists, for example, of one or several laser line generators and one or several measurement cameras that are arranged, for example, in a defined geometrical relation to one another. The sensor head of laser line generator(s) and measurement camera(s) is also arranged in a defined geometrical relation to a measurement object (which changes, for example during a measurement in a previously defined manner). Continuous or triggered operation of profile measurement is performed, for example by a sensor head of laser line generator and measurement camera.

In conventional systems, there is also a fixed allocation between measurement object and laser line. The same results, for example, by a geometrical structure and by a connection between advance unit of the scanner, laser line generator(s) and measurement camera(s). Typically, there is also a movement direction (that is, for example, determined in advance).

In conventional systems, there are different options of triggering. For example, an incremental encoder can be used for triggering the measurement camera(s). Thus, for example measurement values are acquired when external triggering is performed. Triggering can be performed, for example, by a controlled or detected advance at a movement system of the measurement structure.

Typically, there is a direction of movement (that is, for example, determined in advance).

As an alternative (or in addition) to triggering by an incremental encoder, for example, a constant scan velocity can be used. In this case, for example, time-controlled triggering can be used. Alternatively, in this case a free-running scanner can be used.

Conventionally, it is the aim of the acquired profile storage that all acquired profiles will be processed.

SUMMARY

According to an embodiment, an apparatus for three-dimensional measurement of an object may have: a positioning unit that is configured to receive, from a camera, image information showing intersections of a line whose position is to be determined with a plurality of at least three lines of predetermined or known position that are arranged at or on a carrier member that is configured to carry the measurement object and that lie in one plane and that are not all parallel to one another, and to determine a position of the line based on the received image information; wherein the positioning unit is configured to define a coordinate origin of a coordinate system allocated to the line whose position is to be determined and a unit section of the coordinate system allocated to the line whose position is to be determined and to determine a plurality of parameters that describe intersections between the line whose position is to be determined and the lines of the plurality of lines of predetermined or known position; wherein the positioning unit is configured to determine the parameters such that the parameters or amounts of the parameters describe distances of the intersections from the coordinate origin of the coordinate system allocated to the line whose position is to be determined; wherein the positioning unit is configured to determine a position of the coordinate origin of the coordinate system allocated to the line whose position is to be determined in a coordinate system allocated to a carrier member carrying the lines of predetermined or known position or with respect to which the lines of predetermined or known position are imaged in a stationary manner.

According to another embodiment, a method for three-dimensional measurement of an object may have the steps of: receiving, from a camera, image information showing intersections of a line whose position is to be determined with a plurality of at least three lines of predetermined or known position that are arranged at or on a carrier member that is configured to carry the measurement object and that lie in one plane and that are not all parallel to one another, and determining a position of the projected line based on the received image information; wherein the method includes defining a coordinate origin of a coordinate system allocated to the line whose position is to be determined and a unit section of the coordinate system allocated to the line whose position is to be determined, and determining a plurality of parameters that describe intersections between the line whose position is to be determined and the lines of the plurality of lines of predetermined or known position; wherein the parameters are defined such that the parameters or amounts of the parameters describe distances of the intersections from the coordinate origin of the coordinate system allocated to the line whose position is to be determined; wherein the method includes determining a position of the coordinate origin of the coordinate system allocated to the line whose position is to be determined in a coordinate system allocated to a carrier member carrying the lines of predetermined or known position or with respect to which the lines of predetermined or known position are imaged in a stationary manner.

Another embodiment may have a non-transitory digital storage medium having a computer program stored thereon to perform the method for three-dimensional measurement of an object, the method having the steps of: receiving, from a camera, image information showing intersections of a line whose position is to be determined with a plurality of at least three lines of predetermined or known position that are arranged at or on a carrier member that is configured to carry the measurement object and that lie in one plane and that are not all parallel to one another, and determining a position of the projected line based on the received image information; wherein the method includes defining a coordinate origin of a coordinate system allocated to the line whose position is to be determined and a unit section of the coordinate system allocated to the line whose position is to be determined, and determining a plurality of parameters that describe intersections between the line whose position is to be determined and the lines of the plurality of lines of predetermined or known position; wherein the parameters are defined such that the parameters or amounts of the parameters describe distances of the intersections from the coordinate origin of the coordinate system allocated to the line whose position is to be determined; wherein the method includes determining a position of the coordinate origin of the coordinate system allocated to the line whose position is to be determined in a coordinate system allocated to a carrier member carrying the lines of predetermined or known position or with respect to which the lines of predetermined or known position are imaged in a stationary manner, when said computer program is run by a computer.

According to another embodiment, an apparatus for three-dimensional measurement of an object may have: a positioning unit that is configured to receive, image information showing intersections of a line whose position is to be determined with a plurality of at least three lines of predetermined or known position that lie in one plane and that are not all parallel to one another, and to determine a position of the line based on the received image information; wherein the positioning unit is configured to define a coordinate origin of a coordinate system allocated to the line whose position is to be determined and a unit section of the coordinate system allocated to the line whose position is to be determined and to determine a plurality of parameters that describe intersections between the line whose position is to be determined and the lines of the plurality of lines of predetermined or known position; wherein the positioning unit is configured to determine the parameters such that the parameters or amounts of the parameters describe distances of the intersections from the coordinate origin of the coordinate system allocated to the line whose position is to be determined; wherein the positioning unit is configured to determine a position of the coordinate origin of the coordinate system allocated to the line whose position is to be determined in a coordinate system allocated to a carrier member carrying the lines of predetermined or known position or with respect to which the lines of predetermined or known position are imaged in a stationary manner; wherein the apparatus includes a carrier member that is configured to carry a measurement object and that includes a plurality of lines of predetermined or known position for the usage by the positioning unit; and wherein the apparatus includes a camera for providing the image information.

One embodiment according to the present invention provides an apparatus for three-dimensional measurement of an object. The apparatus includes a positioning unit that is configured to receive image information showing the intersection of a line with a plurality of lines of predetermined or known position and to determine a position of the projected line based on the received image information.

This apparatus is based on the knowledge that it is possible and advantageous to determine a position of, for example, a projected line (for example relative to a carrier carrying an object to be measured or also relative to the object itself if, for example, the object comprises a plurality of lines of predetermined or known position) based on image information showing intersections of the projected line with a plurality of lines of predetermined or known position. In particular, it has been found that it is possible, with little or at least reasonable computing effort, to determine the position of the projected line when the intersections of the projected line with a plurality of lines of predetermined or known position within an image or within image information can be evaluated. Thus, it has been found that the position of intersections of a projected line (within an image) with a plurality of lines of predetermined or known position enables a conclusion on the position of the projected line (for example relative to the plurality of lines of predetermined or known position or relative to a coordinate or origin of a coordinate system where the position of the lines is known). Thus, by evaluating the image information showing intersections of the projected line with the plurality of lines of predetermined or known position, it is possible to determine where the projected line is without knowing a relative position, for example of a laser line generator relative to an area (e.g. carrier plate) comprising the lines of predetermined or known position. Thus, for example, the laser line generator (or for example a sensor head including the laser line generator and a measurement camera) can be moved relatively freely, wherein the position of the projected line can still be determined. Thus, it becomes for example unnecessary that the sensor head (or the laser line generator) is guided in a fixed or known position relation to a plane (e.g. carrier plate). Also, for example by deriving information on the position of the projected line from the image information, further (e.g. mechanical engineering) effort for determining a position relation between the laser line generator and an object carrier or an object or for forcing a predetermined position relation between the laser line generator and an object carrier or an object can be significantly reduced or can even be omitted. For example, it can be unnecessary to detect a relative movement between the laser line generator and an object carrier or an object with mechanical sensors (such as incremental encoders) or to enforce a precisely defined relative movement (e.g. by engines and precise guide).

Further, it can be said that by deriving information on the position of the projected line based on the image information (e.g. due to knowledge of the intersections of the projected line with a plurality of lines of predetermined or known position), the mechanical effort is reduced. Determining the position of the projected line can be performed by evaluating image information, which can in many cases be obtained faster and at lower cost than mechanical positioning.

Here, it is appropriate to select the position of the lines of predetermined or known position such that the information on the position of the projected line can be uniquely determined. This is, for example, the case when the number of intersections is so large that a uniquely solvable (or possibly over-determined) equation system results, such that the position of the projected line can be inferred from the position of the intersections of the projected line with the plurality of lines of predetermined or known position. However, it has been shown that depending on the case, two, three or four lines are sufficient that are not all parallel to one another.

Further, it should be noted that the line does not necessarily have to be a projected line. Rather, the line can also be an "imaginary" line, for example when a gray image is viewed with a camera and a specific line in the image is read out. In other words, for example, the intersections between an image line (for example of an image captured with a measurement camera) and the lines of predetermined or known position can be used for determining a position of the image line. Instead of an image line, an image column can be used. Also, a line running transversely through an image can be evaluated.

In other words, when projected line is mentioned herein, generally, any line whose position is to be determined can be meant. However, for reasons of clarity, the following statements relate mostly to a projected line.

In an embodiment, the positioning unit can be configured to define a coordinate origin of a coordinate system allocated to the projected line and a unit section (for example a unit vector s) of the coordinate system allocated to the projected line and to determine a plurality of parameters (for example parameter k) that describe intersections between the projected line and the lines of the plurality of lines of predetermined or known position. It has been found that these intersections between the projected line and the lines of the plurality of lines of predetermined or known position can be efficiently described by such parameters. Thus, it can be assumed that the intersections between the projected line and the lines of the plurality of lines of predetermined or known position all lie (at least approximately) along a straight line in the image information, when it is assumed that, for example, the line projected by the laser line generator lies within a plane with good accuracy and that the lines of the plurality of lines of predetermined or known position lie (at least approximately) in one plane and that the image information represents an essentially undistorted (or corrected by a distortion factor) image of the plane in which the lines of the plurality of lines of predetermined or known position lie. If it is assumed that the stated intersections in the image information essentially lie (for example apart from unavoidable tolerances) along a straight line, the direction of this line can be described, for example by a unit section (for example a unit vector s). The unit section can correspond, for example, to a direction of a regression line through the intersections in the image information. Since, for example the coordinate origin of the coordinate system allocated to the projection line lies at a specific (for example any) point along the regression line through the intersections in the image information, the positions of the image points can be described by the distances from this coordinate origin, wherein the distances from the coordinate origin then represent parameters that describe the intersections between the projected line and the lines of the plurality of lines of predetermined or known position.

Thus, all in all, it is to be stated that the stated intersections that can be seen in the image information (or can be detected by the positioning unit in the image information) are efficiently described by a unit section (for example indicating a direction of a regression line through the intersections in the image information) and by a plurality of parameters indicating, for example, distances of the intersections from a coordinate origin along the regression line.

In an embodiment, the positioning unit can be configured to determine the parameters (describing, for example, a distance between the coordinate origin and the intersections) such that the parameters (for example in the form of positive or negative scalar values) describe distances of the intersections from the coordinate origin of the coordinate system allocated to the projected line (for example a line in the image information defined by the image of the intersections). The parameters can describe, for example, the distances of the intersections in relation to a unit section (for example with a unitary length of 1). Such a determination of the parameters provides an efficient representation, wherein the intersections are represented with a small amount of data based on the assumption that their images in the image information are on a straight line. For example, an amount of a respective one of the stated parameters can be equal to the distance of the respective intersection from the coordinate origin (the coordinate system allocated to the line) or equal to a plurality of this distance, such that the respective parameter generally describes the respective distance. A sign of a respective one of the stated parameters can describe, for example, in what direction, seen from the coordinate origin, the respective interface lies.

In an embodiment, the positioning unit can be configured to determine a position of the coordinate origin of the coordinate system allocated to the projected line within a coordinate system allocated to a carrier member carrying the lines of predetermined or known position (and that can, for example, also carry a three-dimensional object to be measured). By determining the position of the coordinate origin of the coordinate system allocated to the projected line, an important parameter is obtained allowing a conclusion on the actual position of the projected line (for example relative to the carrier member). The lines of predetermined or known position can (alternatively) also be mapped in a stationary manner with respect to the carrier member.

In embodiments, the positioning unit can be configured to obtain constants $n_i$ and $r_i$ that describe the lines of predetermined or known position in a coordinate system in the form of $n_i^T p = r_i$. Thus, when assuming that $n_1$ and p are 2-dimensional vectors, the vector $n_i$ can describe the direction of a line of predetermined or known position. The vector $n_i$ can have a direction that is, for example, orthogonal to a direction of an i-th line of predetermined or known position. The scalar parameter $r_i$ or its amount can, for example, describe a distance that the i-th line of predetermined or known position has to a coordinate origin of a plane where the lines of predetermined or known position lie. The parameters $r_i$ can be positive or negative and the amounts of the parameters $r_i$ can describe the distance of the respective line from the coordinate origin, i.e. the same can be equal to the distance of the respective line from the coordinate origin or equal to a multiple of the distance of the respective line from the coordinate origin. Signs of the parameters $r_i$ can, for example, indicate on which side of the respective line the coordinate origin lies. Thus, it has to be stated that, for example, an i-th line of predetermined or known position can be described by a 2-dimensional vector $n_i$ and a scalar quantity $r_i$. Then, all points whose coordinate vectors p fulfill the equation $n_i^T p = r_i$ belong to the i-th line of predetermined or known position.

The positioning unit can obtain the stated constants $n_i$ and $r_i$ in different ways. For example, the respective constants $n_i$ and $r_i$ can be known in advance to the positioning unit. Alternatively, the positioning unit can obtain the constants $n_i$ and $r_i$ via an interface or via image evaluation. The stated constants can also be input by a user. In summary, it is to be stated that it is advantageous when the positioning unit obtains the position of the line in the stated representation format, since this representation format has been found to be advantageous for evaluation. However, the positioning unit can also be configured to derive the stated constants $n_i$ and $r_i$ from a different representation format, for example a representation format where the lines of predetermined or known position are described by a point of the line and a direction vector.

In an embodiment, the positioning unit can be configured to determine information on the position of the lines of predetermined or known position by using information included in a 1-dimensional or 2-dimensional optical code. In that way, the positioning unit can be configured, for example to evaluate a barcode encoding the information on the position of the lines of predetermined or known position. Alternatively, the positioning unit can also be configured to evaluate a 2-dimensional optical code (e.g. a QR code) carrying information on the position of the lines of predetermined or known position. Thus, the positioning unit can determine, for example by evaluating optically encoded information, the position of the lines of predetermined or known position, which enables a simple configuration of the positioning unit without manual adjustment.

In an embodiment, the positioning unit can be configured to determine parameters $k_i$ describing the intersections in a coordinate system in the form $p_i = p_0 + k_i s$. Here, for example $p_i$ can be a position vector of the i-th intersection (e.g. an intersection of the projected line with an i-th line of predetermined or known position). $P_0$ can, for example, be a position vector of a coordinate origin of a coordinate system allocated to the projected line. s can, for example, define a unit section, such as a unit vector of the coordinate system allocated to the projected line. Thus, $k_i$ can, for example, be a scalar parameter allocated to the i-th intersection (with coordinate vector $p_i$). Thus, for example, the positioning unit can determine an associated parameter $k_i$ for each of the intersections (with index i). Determining the parameter $k_i$ can be based, for example on a determination of an (possibly average) unit section s (describing, for example, a direction of a regression line through the intersections in the image information) and a determination of a coordinate origin of a coordinate system allocated to the projected line. The coordinate origin, described by the coordinate vector $p_0$ can be determined, for example arbitrarily along the (regression) line through the intersections, wherein the values of $k_i$ vary accordingly. By respective determination of parameters $k_i$, efficient determination of the position of a (regression) line through the intersections in a coordinate system of the lines of predetermined or known position is enabled.

In an embodiment, the positioning unit can be configured to solve an equation system exactly or approximately (for example in the sense of a least squares solution) in order to determine the parameters $p_0$ and s describing the position of the projected line (for example in a coordinate system of the lines of predetermined or known position). The respective system of equations can include, for example, as known quantities, information defining the position of lines of predetermined or known position as well as the parameters $k_i$. Further, the system of equations can include, as unknown quantities, the position of the coordinate origin of the (regression) line through the intersections in the coordinate system of the lines of predetermined or known position as well as the direction vector describing the direction of the (regression) line through the intersections (in the coordinate system of the lines of predetermined or known position). Thus, by solving a (possibly overdetermined) linear system of equations, it is possible to determine the position of the (regression) line through the intersections in the coordinate system of the lines of predetermined or known position. Thereby, the position of the projected line in the coordinate system of the lines of predetermined or known position can be determined effectively. By the stated procedure, the position of the projected line in the coordinate system of the lines of predetermined or known position can be efficiently determined, wherein conventional and efficient means for solving the systems of equations (also in the sense of a solution with least squares in overdetermined systems of equations) can be used.

In an embodiment, the apparatus for three-dimensional measurement of an object can comprise a carrier member that is configured to carry a measurement object and that comprises a plurality of lines of predetermined or known position for usage by the positioning unit. In that the lines of predetermined or known position are arranged at the carrier member that is configured to carry the measurement object, the position of the projected line on the carrier member can be determined. Here, for example, the position of the projected line or a plane in which the line is projected can be inferred with respect to the measurement object. Here, the lines of predetermined or known position are arranged on the carrier member such that a unique solution of the above-described linear system of equations is possible, which again enables a unique determination of the position of the projected line.

In one embodiment, for example four lines can exist, which are, for example, not all parallel to one another or of which at most two are parallel to one another.

In an embodiment, the carrier member can comprise at least four lines of predetermined or known position. By such a number of lines, for example, a unique determination of the position of the projected line can be enabled.

In a further embodiment, the lines of predetermined or know position can include, in pairs, an angle of at least 2°, or at least a subset of the lines of predetermined or known position can include, in pairs, an angle of at least 2°. By avoiding parallelism of lines or by avoiding angles between the lines that are too small, for example, uniqueness of the determination of the position of the projected line can be obtained, or an accuracy of the determination of the position of the projected line can be improved.

In an embodiment, the apparatus can comprise a camera for providing image information and/or a projection means for generating the projected line. Here, camera and/or projection means are movable with respect to the carrier member. Here, the determination of the position of the projected line based on the image information enables the determination of the position of the projected line independent of mechanical position encoders. Thus, the mechanical structure is eased and reduced in cost. Further, for example a guide of the projection means (generating, for example, the projected line) does not have to fulfill any specific requirements with respect to accuracy or position reproducibility. Rather, the position of the projected line (and based thereon also information on the position of a plane within which the projection beams lie) can be derived from the image information.

In an embodiment, the positioning unit can be configured to determine a position of the projected line in relation to the carrier member (i.e. with respect to a support). It has been found that knowing the position of the projected line in relation to the carrier member enables a conclusion on the position of the projection means or a position of a plane in which the projection beams lie that is sufficient in these cases.

In a further embodiment, the positioning unit can be configured to fulfill the function of a trigger means. In that case, the positioning unit that also serves as trigger means obtains image information from a measurement camera and is configured to trigger, depending on an image content of an image information, a measurement output, such as forwarding the image information to an evaluation means for determining measurement results or evaluating the image information by an evaluation means for determining measurement results. In other words, for example, a result of the positioning (for example information on a position of the projected line) can be used to trigger measurement output (for example forwarding the image information to an evaluation means for determining measurement results) or evaluation of the image information by an evaluation means for determining measurement results. Thus, for example a measurement output or an evaluation of the image information by an evaluation means for determining measurement results can be performed in response to the fact that the positioning unit detects that the projected line has a specific position. Alternatively, for example, the measurement output or the evaluation of the image information can be triggered when the positioning unit has found out that the position of the projected line has changed in a specific manner with respect to a position existing in a previous measurement output or a previous evaluation of the image information. Thus, for example, triggering the measurement output (or also evaluating the image information by an evaluation means for determining measurement results) can be performed exclusively based on the image content. Thus, mechanical position sensors can be saved or the requirement of moving the object to be measured in a specific manner, for example with constant velocity, can be omitted.

Thus, based on the image analysis performed by the positioning unit (and based on the information on the position of the projected line obtained by the positioning unit), the measurement output or the evaluation of the image information can be triggered in dependence on the image analysis.

Thus, by the inventive concept, image information showing a laser light section can be analyzed for determining, for example the information on the position of the projected line. Based on this analysis, forwarding the image information or evaluating the image information by the evaluation means for determining measurement results can be triggered.

In an embodiment, by using a laser light section (or a different light section), three-dimensional marks (for example on a surface of a support on which a measurement object resides) or 2-dimensional optical characteristics along a laser line (e.g. a line described by a laser on a planar or curved area) can be detected as features, and depending on detected features, forwarding the image information or evaluating the image information by the evaluation means for determining measurement results can be triggered. The three-dimensional marks on the surface or the variable 2-dimensional optical characteristics along the laser line can describe, for example, the plurality of lines of predetermined or known position.

Further, in an embodiment, information on a reliability of line detection or information on a width of a line can be obtained (for example in addition to the information on the information on the intersections of the projected line with a plurality of lines of predetermined or known position). Thus, depending thereon, forwarding the image information or evaluating the image information by the evaluation means for determining measurement results can be triggered. By considering further information, e.g. on a reliability of line detection or a width of a line, the reliability when triggering the forwarding or when triggering the evaluation of the image information can be increased.

In an embodiment, in addition to determining the position of the projected line, it can be detected when the image content has shifted with respect to a reference image content by at least a predetermined shift (or by more than a predetermined shift). Thus, also in dependence on the detection of the shift, forwarding the image information or evaluating the image information by the evaluation means for determining measurement results can be triggered. By evaluating shift information in addition to the information on the position of the projected line, triggering the forwarding of the image information or the evaluation of the image information can be made even more reliable.

In an embodiment, based on image content, a movement of a camera providing the image information and/or shift of a light source irradiating the measurement object and/or a movement of the measurement object can be determined or estimated. In that case, triggering the forwarding of the image information or the evaluation of the image information by the evaluation means for determining measurement results can be triggered in dependence on the determination or estimation of the shift.

In an embodiment, the positioning unit is configured to use a three-dimensional reconstruction for movement estimation during the analysis of the image content and/or to perform a comparison of gray value features in an advance direction and/or to detect marks and/or to detect color terms. This analysis of the image content can, for example, be performed supplementary to the detection of the intersections and be used, for example, to support the triggering.

In an embodiment, the positioning unit can be configured to evaluate, during the analysis of the image content, information or surface information (for example with regards to cracks and/or gaps and/or scratches). Thereby, positioning and/or triggering can be improved.

In a further embodiment, the positioning unit can be configured to consider image information that is captured from several different directions. This can also improve the quality of positioning and triggering.

In a further embodiment, the positioning unit can be configured to determine one or several polarization characteristics or a change of one or several polarization characteristics (for example to detect different materials, to detect a variation of the penetration depth of a laser beam and/or to detect a relative movement between a camera and the measurement object and/or to detect a relative movement between the light source and the measurement object) and to trigger, in dependence thereon, forwarding of the image information or evaluating the image information by the evaluation means for determining measurement results. In that way, additional information can be used for triggering.

In a further embodiment, the positioning unit can be configured to decide whether a result is output or whether the output is suppressed. In that way, based on the determination of the position of the projected line (or based on additional features) it can be determined, whether further evaluation or an output of the image information is to be performed or not.

In a further embodiment, the positioning unit can be configured to analyze different features of the image content and/or to analyze features in different areas of the image content. In that way, positioning and decision on the triggering can be improved.

In a further embodiment, the positioning unit can be configured to generate one or several control signals for one or several laser line generators and/or to generate one or several control signals for one or several illumination means for changing the illumination of the measurement object in dependence on image content of the image information. For example, also based on the determination of the position of the projected line, the laser line section triangulations or other illumination means can be influenced in order to adjust, for example, the position of the projected line in a desired manner.

In an embodiment, the positioning unit can be configured to detect based on image content of the image information whether a region of interest of the measurement object can be measured or not and to trigger, depending thereon, forwarding of the image information or evaluating the image information by the evaluation means for determining measurement results. In that way, forwarding of useless information or evaluation of useless information can be avoided.

In an embodiment, the positioning unit can be configured to trigger, in response to a detection of a change of a relative position between the projected line and the lines of predetermined or known position, an output or evaluation of a profile (for example a cross-section of the object to be measured with a plane spanned by the projected line). In that way, automatic triggering can be performed when the positioning unit detects that the projected line has a suitable orientation or that the position of the projected line with respect to a previous position has changed such that it seems useful or worthwhile to perform a new evaluation.

In an embodiment, the apparatus is configured to scan a measurement object in a three-dimensional manner without a camera for generating the image information and/or a light source for irradiating the measurement object being guided in a fixed manner, or wherein the camera for generating the image information and/or the light source for irradiating the measurement object is configured for manual guidance. Due to the fact that the position of the projected line (generated, for example, by the light source) is determined, for example relative to the lines of predetermined or known position, it can be obtained that a fixed guide determining a relative position between the light source and/or the camera and the object to be measured can be omitted. Rather, for example, the light source and/or the camera for generating the image information can be guided manually, wherein the position of the plane projected by the light source or at least the position of the line projected on a carrier plate can be determined optically. In that way, a mechanical structure of the apparatus can be significantly simplified and the flexibility of handling is significantly increased.

In an embodiment, the apparatus is configured to detect an object in the outdoor area (e.g. to scan the same), to measure a travel path (e.g. a road or rails) or to detect or to measure a fault location. Such an application is favored or enabled in that the position of a line projected onto an area can be determined optically.

An embodiment according to the invention provides a method for three-dimensional measurement of an object. The method includes receiving image information showing intersections of a projected line with a plurality of lines of predetermined or known position and determining a position of the projected line based on the received image information. The respective method is based on the same considerations as the above-discussed apparatus. Further, the method can be supplemented by all features and functionalities of the above-described apparatus, either individually or in combination.

A further embodiment according to the invention provides a computer program for performing the stated method when the computer program runs on a computer.

BRIEF DESCRIPTION OF THE DRAWINGS

Embodiments of the present invention will be detailed subsequently referring to the appended drawings, in which:

FIG. 6 is a schematic illustration of the process when determining a position of a projected line according to an embodiment of the present invention.

DETAILED DESCRIPTION OF THE INVENTION

Details of the embodiments will be described below with reference to the above-discussed figures.

It should be noted that details of the different embodiments can be combined with one another as long as there are no compelling opposing reasons.

1. Apparatus for Three-Dimensional Measurement of an Object According to FIG. 1

Figure 1:
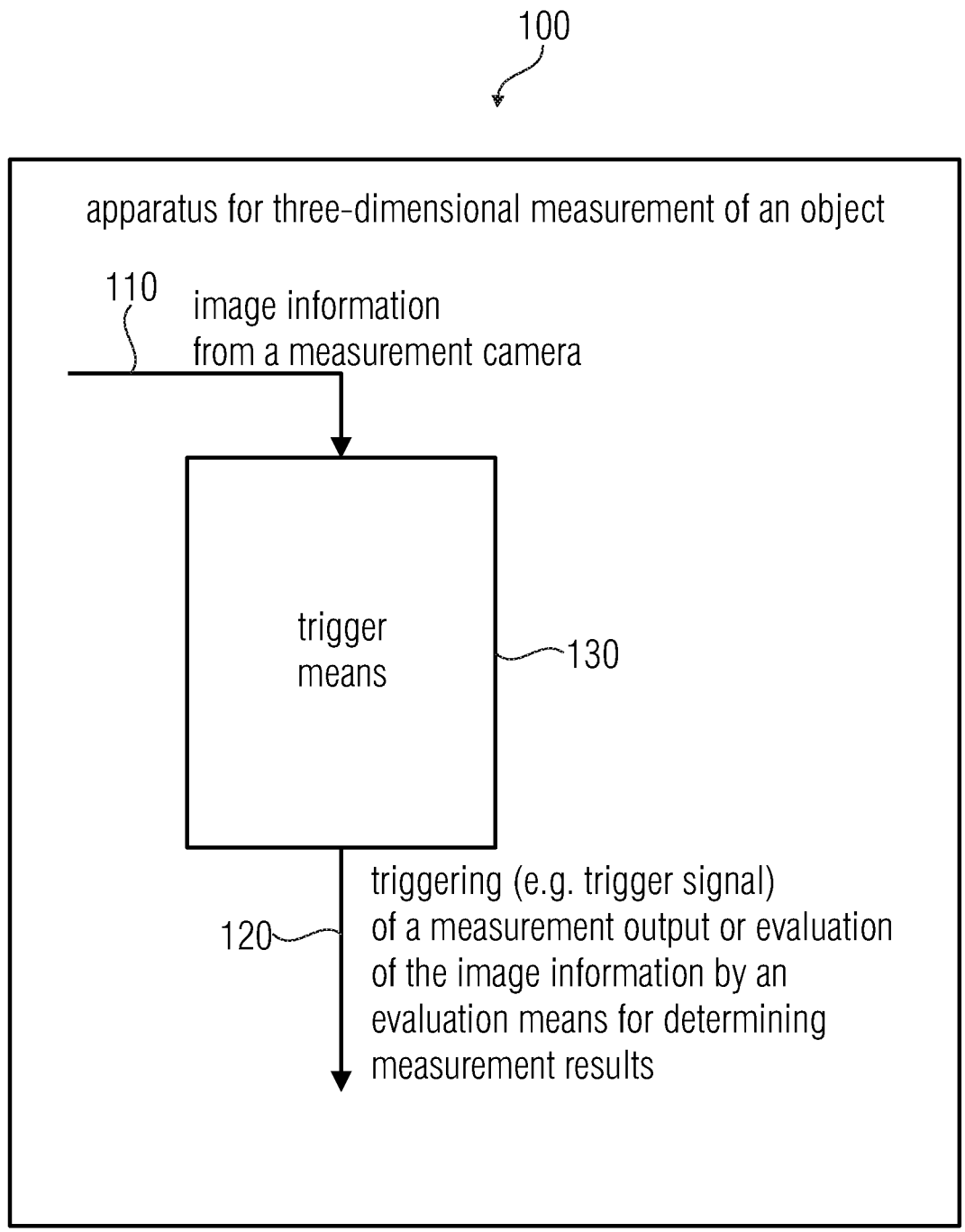
FIG. 1 is a schematic illustration of an apparatus for three-dimensional measurement of an object according to an embodiment of the present invention.

FIG. 1 shows a schematic apparatus for three-dimensional measurement of an object according to an embodiment of the present invention. The apparatus 100 for three-dimensional measurement of an object is configured to obtain or to detect image information 110 from a measurement camera. The measurement camera (not shown herein) can, for example, be part of the apparatus 100 or can be an external component. In particular, the apparatus 100 is configured to obtain a trigger signal, triggering for example a measurement output or an evaluation of the image information by an evaluation means for determining measurement results. Here, the trigger signal is, for example, indicated by 120. The apparatus 100 includes a trigger means 130. The trigger means 130 is configured to obtain image information 110 from the measurement camera and to trigger, in dependence on the image content of the image information, a measurement output (for example forwarding the image information to an evaluation means for determining measurement results) or a further detailed evaluation of the image information by the evaluation means for determining measurement results.

Thus, it has to be stated that the evaluation means 130 can determine, for example based on the image information 110 obtained from the measurement camera, when image information from the measurement camera (or the image information 110 from the measurement camera) is used for further detailed evaluation. For that purpose, the trigger means 130 can generate a trigger signal either triggering the forwarding of the image information 110 or triggering an actual usage of the image information 110 for further detailed evaluation.

Thus, it has to be stated that a first stage of image processing performed by the trigger means 130 can decide what image information (e.g. what image of a sequence of images) is used for a further, more accurate evaluation (for example for three-dimensional measurement of an object). Thus, the trigger means 130 can detect, for example due to image recognition (or generally in dependence on an image content of the image information 110) a point of time at which the image information can be used for further detailed evaluation. Thus, it can be obtained, for example, that an output of the image information 110 from a measurement camera or from an image sensor of the measurement camera to an evaluation means for determining measurement results is only performed when the trigger means 130 detects that the image information shows that further detailed evaluation appears to be promising. For example, the evaluation means 130 can determine, based on the image content of the image information, whether the image information fulfills specific basic prerequisites that are needed for further detailed evaluation of the image information by the evaluation means for determining measurement results. Alternatively or additionally, the trigger means 130 can determine, for example, whether the image content of the image information has changed to a sufficient extent with regard to image information used for an earlier (further) detailed evaluation. Thus, for example, multiple output or evaluation of almost identical image information can be avoided.

The trigger means 130 can be useful, for example, when a suitable or optimum point of time for outputting the image information or for further detailed evaluation of the image information cannot be detected by other, for example mechanical, sensors. Further, the detection of the suitable or optimum point of time for the output or for the further detailed evaluation of the image information is particularly helpful when a light source and/or a camera that are used during three-dimensional measurement of the object for illuminating the object are freely movable.

In the following, some details with respect to the apparatus for three-dimensional measurement of an object and with respect to the trigger means will be described that can be used independently or that can optionally be used in connection with the above-described embodiment.

According to an aspect of the present invention, the apparatus 100 can be used, for example, in the context of a system performing a laser light section scan of an object (for example for three-dimensional measurement of the object).

In some embodiments, the apparatus for three-dimensional measurement of an object described herein offers the advantage that any positioning of a laser line (or generally a projected line) across a measurement object is possible, which allows, for example free-hand scanning. In some embodiments, the apparatus for three-dimensional measurement of an object allows also an independence of position encoders, e.g. an independence of conventional mechanical encoders that detect a relation between an object to be detected (or to be measured) (or at least a carrier member that carries the object to be detected) and a laser line generator (or several laser line generators) and/or a measurement camera (or several measurement cameras). According to a further aspect of the present invention, some embodiments allow optimum resolution depending on the scan object and the surface/structure of the measurement object.

In the following, a whole series of details with respect to triggering will be described that can be used individually or in combination with the embodiment according to FIG. 1 (or in connection with the further embodiments described herein).

According to one aspect of the invention, the invention solution for triggering image capturing differs from conventional concepts among others in that no electric coupling exists between advance of the measurement object and the measurement system, for example by incremental encoder or timers consists for a fixed time interval; and the triggering of the measurement camera is performed exclusively by the image content or features derived therefrom (or the triggering of a measurement output from the measurement camera follows exclusively by the image content).

This means that the measurement system (for example the trigger means 130) permanently (or at least across an extensive time period) performs image analysis based on suitable features and only when certain predefined criteria are fulfilled, the same performs image output, i.e. seen from the outside, outputs a self-triggered measurement result. Here, for example, one or several features for detecting a picture (or for triggering a measurement output or an evaluation of the image information by an evaluation means for determining measurement results) described below can be selected.

Features of a laser light section can be used, for example, for detecting a picture (or for triggering). For example, it is possible to select three-dimensional marks on the surface of a support on which the measurement object resides, or three-dimensional marks at the measurement object (visible, for example, in a laser light section) for detecting a picture. Alternatively or additionally, it is possible to use 2-dimensional optical characteristics along the laser line for detecting a picture (or for triggering). Alternatively or additionally, it is possible to select general features from a processing chain within the measurement camera for detecting a picture (or for triggering). In summary, it can be said that when evaluating a laser light section, three-dimensional marks on the surface of the support on which the measurement object resides and/or three-dimensional marks at the measurement object and/or 2-dimensional optical characteristics along the laser line and/or general features from the processing chain in the measurement camera can be selected for detecting a picture.

The three-dimensional marks on the surface of the support on which the measurement object resides, or the three-dimensional marks at the measurement object, can be, for example, projections or recesses (e.g. a Braille code) and/or drill holes and holes and/or edges and steps, e.g. due to a start of the measurement object. Such three-dimensional marks on the surface of the support on which the measurement object resides or at the measurement object can be detected, for example, in an image of the laser light section, e.g. as change in brightness or as deviation from a straight course of the laser light section. In other words, measurement output or further evaluation of the image information can be triggered, for example, when it is detected in an image information showing an image of the laser light section that the laser light section intersects one or several three-dimensional marks on the surface of the support on which the measurement object resides, or one or several three-dimensional marks at the measurement object. Possibly, certain characteristics of the three-dimensional marks, for example their distance or relative arrangement to one another can be considered. Optionally, the three-dimensional marks can also be defined by lines of predetermined or known position, such that a position of the projected line (i.e. the laser light section) can be detected based on an image evaluation and such that the resolution of the measurement output or the further evaluation can be performed based on the detection of a specific position of the projected line (the laser light section).

Further, as briefly discussed above, alternatively or additionally, 2-dimensional optical characteristics along the laser line can be used for detecting a picture (or for triggering a measurement output or further evaluation of the image information). A possible 2-dimensional optical characteristic along the laser line can be a change of the reflectance that can be caused, for example by a dull and/or metallized surface or that can be caused, for example, by a change of an angle of reflection of the surface. Thus, for example based on an evaluation of an image of a laser line (formed by a laser light section), it can be detected when the laser light section impinges on a portion with dull surface or with metallized surface or with changed angle of reflection of the surface or sweeps such a portion. Detecting a change of a reflectance can also be detected, for example, simply based on detecting a changed intensity of the image of the laser light section. Here, on the one hand, the presence of a change of the reflectance or also a specific spatial pattern by which the reflectance changes can cause triggering of a measurement output or an evaluation of the image information. Also, a change of volume scattering can be evaluated as a 2-dimensional optical characteristic along the laser line. This can, for example, be caused by the presence of an optically dense plating on a volume-scattering material. For example, this can also be caused by the presence of copper on FR4 material or carrier material, respectively. In that way, a change of volume scattering along a laser line due to the image processing can be detected, and the presence of the change of volume scattering or a detected pattern of the change of the volume scattering along the laser line can be used to trigger a measurement output or an evaluation of the image information.

Further, as a 2-dimensional optical characteristic along the laser line, the presence of a color term or the presence of several color terms can be detected and can be used for triggering a measurement output or for triggering the evaluation of the image information. One or several color terms can, for example, be matching or complementary to a color of the laser line. Thereby, the presence of a color term or several color terms along the laser line in an image of the laser line and the laser light section, respectively, can be detected with little effort and can hence be used for triggering.

If a laser light section or a feature of a laser light section is used for detecting a picture (or for triggering a measurement output or for evaluating image information), also, general features from the processing chain in the measurement camera can be used for prompting the triggering. For example, as a feature from the processing chain in the measurement camera, reliability of the detected line (or a respective information on the reliability) can be used. In that way, for example, intermediate results from the processing of the laser line can be used (wherein such intermediate results can comprise, for example, information on the reliability of the detected line). Alternatively or additionally, start (or triggering) can be initiated, as soon as the laser line appears in the image and/or as soon as image processing detects a laser line with a predetermined measure of reliability. Alternatively or additionally, also, a local width of the laser line can be used as general feature from the processing chain in the measurement camera for detecting a picture or for triggering a measurement output or an evaluation of the image information. Here, the local width of the laser line is a feature coupled to volume scattering or reflectance.

In summary, it has to be stated that different information that can be derived during evaluation of a laser light section can be used individually or in combination for detecting a picture or for triggering a measurement output or for triggering an evaluation of the image information.

As an alternative or in addition to an evaluation of a laser light section (or an image of a laser light section), also, a gray image and advance correlation can be used for detecting a picture (or for triggering a measurement output or for triggering an evaluation of the image information). For example, a gray image can be evaluated that does not only show the projected line or the laser light section but a more comprehensive image, for example of the object to be measured and/or the carrier member carrying the object to be measured. For example, based on a gray image, a correlation of successive images and derivation of movement information can be performed, wherein the movement information can then serve to trigger a measurement output or to trigger an evaluation of the image information. The correlation of successive images and the derivation of the movement information can be performed, for example, with 2-dimensional irradiation or a point-shaped irradiation for optical scanning of the surface (for example one or several points of the surface). In planar illumination, for example, a planar image section can be evaluated, and movement information can be derived based on the evaluation of an area section. In point-shaped illumination of one or several points of the object, it can be detected, for example, whether an image of the illuminated points moves with respect to a previous state. As an alternative or in addition to the correlation of successive images, optical features can also be used for detecting a picture or for triggering a measurement output or for triggering an evaluation of image information. Alternatively or additionally (for example based on a gray image and advance correlation), a three-dimensional stereo reconstruction can also be used for movement estimation. Here, distance and position information can be used for triggering a measurement process (or for triggering a measurement output or an evaluation of the image information).

When using a gray image and advance correlation, as an alternative or in addition to the above-described evaluations, detection of marks and color changes can be performed. For example, marks attached to the object to be measured and transition between areas of different colors can be evaluated for triggering a measurement output or for triggering evaluation of the image information.

As an alternative or in addition to the evaluation of a laser light section and as an alternative or in addition to the evaluation of a gray image with advance correlation, evaluation of height information can be performed, e.g. of cracks and/or gaps and/or scratches. For example, a description of cracks and gaps can be performed, for example by missing reflections with specific local extension. Here, for example, local jumps of the height information having a specific width and/or temporal jumps of the height information having specific temporal characteristics can be evaluated. All in all, based on height information, detection of a picture (or triggering of a measurement output or an evaluation of an image information) can be performed.

As an alternative or in addition to the evaluation of a laser light section and as an alternative or in addition to the evaluation of a gray image with advance correlation or as an alternative or in addition to the usage of height information, a picture, for example of an object to be measured, can be captured from different directions with several cameras or several laser line generators in different positions for detecting a picture. Here, for example, differences in the detected characteristics from different directions can be used for detecting a picture and/or coverages or multiple reflections can be used for detecting a picture.

As an alternative or in addition to the evaluation of a laser light section or as an alternative or in addition to the evaluation of a gray image with advance correlation or as an alternative or in addition to the evaluation of height information or as an alternative or in addition to the evaluation of a picture from different directions, change of polarization can be evaluated and/or detection of different materials can be evaluated in order to trigger measurement output or evaluation of the image information. Detecting different materials can be performed, for example, by multispectral analysis. Alternatively or additionally, when detecting different materials, also, the variation of the penetration depth of the laser beam can be performed. Thus, the detection of the presence of different materials can serve, for example, to trigger a measurement output or an evaluation of the image information.

In the following, different aspects will be discussed with respect to the determination of features that can optionally be used in the embodiments described herein.

For example, the above-illustrated characteristics (or features) (for example features of the laser light section, features of the gray image etc.) can be analyzed on the sensor or on a downstream processing unit. For example, the sensor can be configured to perform a first analysis (for example for triggering a measurement output or for triggering a further detailed evaluation of the image information by an evaluation means for determining measurement results) based on analog signals from an image sensor (i.e. for example prior to digitalization). As an alternative, in some embodiments, the evaluation for triggering a measurement output or for triggering an evaluation of the image information can be performed in a separate processing unit (for example based on digitalized signals of the image sensor).

According to one aspect, image processing can be performed by means of software or by means of specifically developed hardware blocks.

According to one aspect of the invention, instant determination of the results can be performed without or with only very little latency. In other words, the evaluation performed by the trigger means, which is typically quite simple, can be performed at high speed while a subsequent further detailed evaluation of the image information by an evaluation means for determining measurement results is normally significantly more expensive and time intensive.

According to one aspect of the invention, the evaluation (by the trigger means) is performed for deciding whether results are output (for example by triggering a measurement output) or the output is suppressed.

According to one aspect of the invention, an evaluation of different features can be performed on the sensor field at different regions of interest.

According to a further aspect of the invention, the detected characteristics can be used for determining the position of the examined regions of interest.

According to a further aspect of the invention, determination of the features can be controlled by an external digital interface for synchronous or asynchronous parameters based on which the triggering is decided. For example, the external digital interface can determine by which of the features triggering is to be performed. Thus, for example the function of the trigger means can be adapted to the respective conditions of the image content (e.g. of an object to be measured).

According to a further aspect, for example, control signals for laser line generators and illumination systems for changing or switching an illumination can be output directly. Thus, for example, the trigger means can generate control signals for one or several laser line generators and/or for one or several other illumination systems. In response to detecting a triggering event by the trigger means, a laser line generator can be controlled, for example, to change a laser line, for example to shift the same. As an alternative, a laser line generator can also be prompted by the trigger means to activate a laser line or to increase the intensity of the same.

Thus, in summary, it has to be stated that the apparatus 100 as described based on FIG. 1 can optionally be supplemented by many details. Triggering by the trigger means 130 can optionally be obtained based on features obtained by a laser light section and/or based on features obtained by a gray image and advance correlation. Alternatively or additionally, features can be used that are based on height information and/or features that are based on a picture from different directions. Further, alternatively or additionally, features can be used that are based on a change of polarization and/or features that are based on a detection of different materials.

As discussed above, the determination of features can be performed in different ways, for example on the sensor or on a downstream processing unit. The determination of features can be performed in hardware or in software, but typically with comparatively low latency in order to effect timely triggering of a measurement output or further detailed evaluation of the image information. When evaluating the obtained information, control information, for example for further detailed evaluation of the image information can be used by an evaluation means for determining measurement results. Additionally, like the trigger means, a laser line generator and/or an illumination system can be controlled.

Further, it should be noted that based on FIG. 1 the discussed concept can be supplemented by all features and functionalities that are described in the present document, either individually or in combination.

2. Apparatus for Three-Dimensional Measurement of an Object According to FIG. 2

Figure 2:
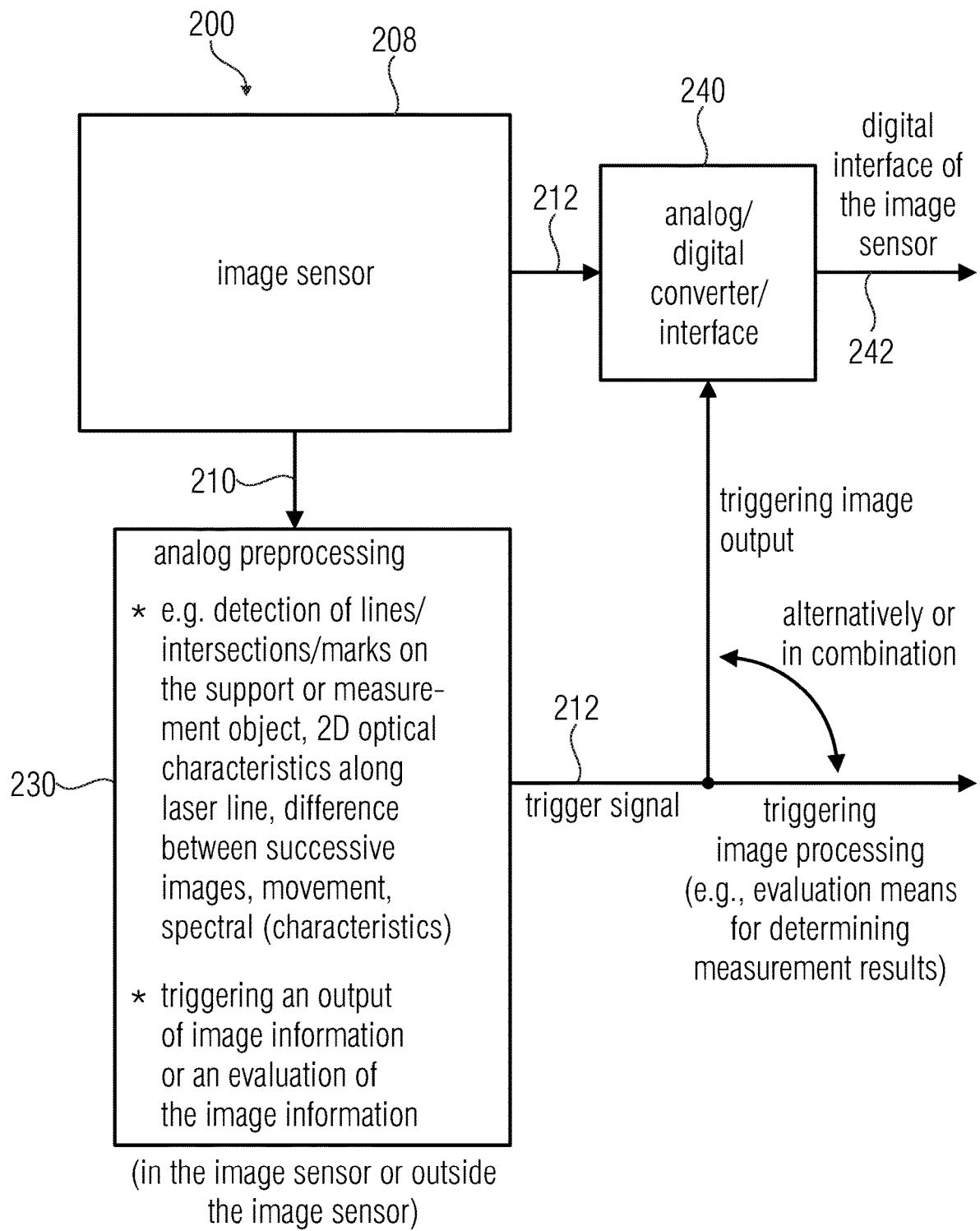
FIG. 2 is a block diagram of an apparatus for three-dimensional measurement of an object according to an embodiment of the present invention.

FIG. 2 shows a schematic illustration of an apparatus for three-dimensional measurement of an object according to a further embodiment of the present invention.

The apparatus according to FIG. 2 is indicated by 200 in its entirety.

The apparatus 200 includes an image sensor 208 that can provide, for example, image information 210 and image information 212. The image information 210 can, for example, be a representation of image information in the form of analog image sensor signals. the image information 212 can, for example, also be a representation in the form of analog signals of the image sensor.

Further, the apparatus 200 comprises an analog preprocessing 230 receiving, for example, image information 210 in the form of analog image sensor signals. Analog preprocessing 230 can, for example, take over the function of the trigger means 130 according to FIG. 1. The analog preprocessing 230 can, for example, be configured to detect lines on the carrier member that carries the object to be measured or on the object to be measured itself, intersections between a projected line and lines on the carrier member or on the object to be measured itself, and/or marks on the carrier member (support) or on the object to be measured itself (measurement object), and/or 2-dimensional optical characteristics along a projected line and to possibly determine parameters that describe the detected lines, intersections, marks or optical characteristics and to output the same. Alternatively or additionally, the analog preprocessing can be configured to detect a difference between successive images and/or a movement of the object or the object carrier and possibly describe them by parameters. The analog preprocessing can be performed, for example, immediately by hardware and hence evaluate, for example, the analog image sensor signals without previous digitalization. At the end of the evaluation can be a threshold decision signaling a detection of lines, intersections, marks, optical characteristics or of movements. Respective parameters that can describe the detected lines, intersections, marks, optical characteristics or movements can then, for example, be determined digitally, wherein, however multi-stage digitalization of image sections or total images is omitted.

Thus, the analog preprocessing 230 can prompt, based on the detection of lines, intersections, marks, optical characteristics, differences between successive images or movements, triggering of an output of an image information or an evaluation of the image information. For that purpose, the analog preprocessing 230 can generate, for example, a trigger signal 220 that can, for example, correspond to the trigger signal 120 in the apparatus 100 according to FIG. 1.

The trigger signal 220 can be supplied, for example, to an output unit 240 that comprises, for example, an analog-digital converter and a digital interface. The output unit 240 can, for example, receive the image information 212 from the image sensor (for example in the form of analog image sensor signals) and can trigger, in response to the trigger signal 220, analog-digital conversion as well as an output of the digitalized image information via the digital interface 242.

Alternatively, the trigger signal 220 can also be used to trigger image processing (e.g., further detailed image processing by an evaluation means for determining measurement results). This further detailed image processing providing, for example, information on a shape of an object to be measured along a projected plane can, for example, be performed by a separate evaluation means that receives the image information via the digital interface 242.

By separating the further detailed image processing, typically performed based on digitalized image information, from analog preprocessing 230 that is performed, for example, based on analog image sensor signals, can be obtained, for example, that the data-intensive transmission of the image information via the digital interface 242 of the image sensor only has to be performed when the sensor-related analog preprocessing detects the presence of a trigger condition (and signalizes the same by the trigger signal 220). Since in particular the detection of the trigger condition is typically simpler than the determination of a measurement result, the separation of triggering from the evaluation means for determining the measurement result is useful.

3. Apparatus for Three-Dimensional Measurement of an Object According to FIG. 3

Figure 3:
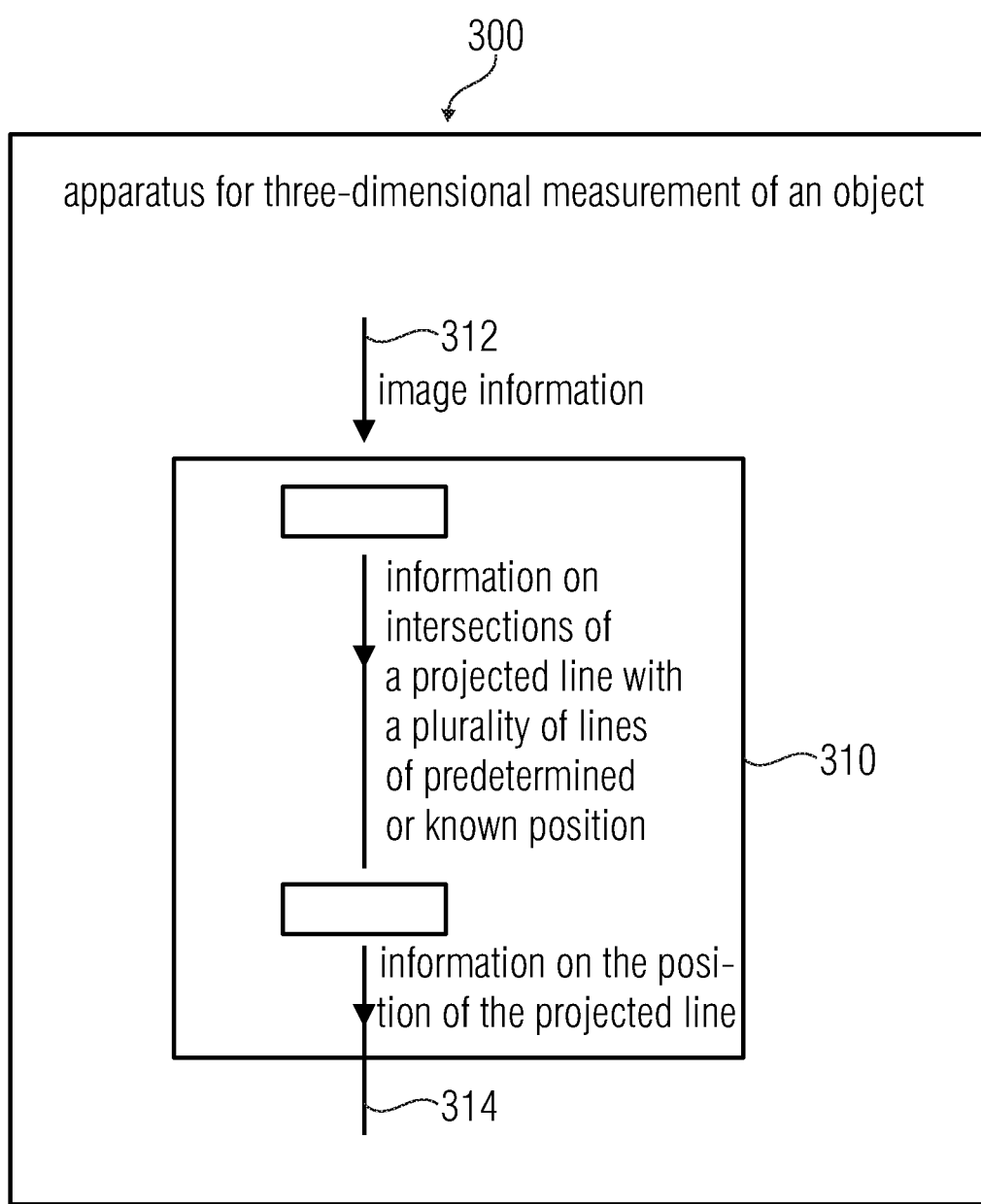
FIG. 3 is a schematic illustration of an apparatus for three-dimensional measurement of an object according to an embodiment of the present invention.

FIG. 3 shows a schematic illustration of an apparatus for three-dimensional measurement of an object according to an embodiment of the present invention. The apparatus according to FIG. 3 is indicated by 300 in its entirety. The apparatus for three-dimensional measurement of the object includes a positioning unit 310. The positioning unit 310 receives image information 312 and provides, based on the image information 312, information 314 on a position of the projected line. The positioning unit 310 is configured to receive image information showing intersections of a projected line with a plurality of lines of predetermined or known position and to determine a position of the projected line based on the received image information. The position of the projected line can, for example, be represented by the information 314.

Thus, the positioning unit is configured to obtain, based on comparatively simple image processing that essentially involves the detection of intersections of the projected line with a plurality of lines of a predetermined or known position, information on the position of the projected line, for example, relative to the lines of predetermined or known position or relative to an origin of coordinate system where the position of the plurality of lines of predetermined or known position is known. In that the positioning unit relies essentially on the position of the respective intersections in its calculation and determines the same, for example, based on image processing, it is possible to determine the position of the projected line in a simple manner without any large effort in image processing.

The apparatus 300 according to FIG. 3 is based on the knowledge that the intersections of a projected line with a plurality of lines of predetermined or known position can be determined in image information with comparatively little effort and that the information on the position of the intersection still allows, in many cases, a clear and precise conclusion on the position of the projected line.

Further details will be described below. In other words, the apparatus 300 according to FIG. 3 can optionally be supplemented by all features and functionalities that are described herein. It should be noted that the further features and functionalities described herein can be incorporated individually or in combination into the apparatus 300 according to FIG. 3.

4. Apparatus According to FIGS. 4 and 5

In the following, an apparatus for three-dimensional measurement of an object will be described in more detail with reference to FIGS. 4 and 5. Then, a process of determining a position of the projected line will then be discussed based on FIG. 6.

Figure 4:
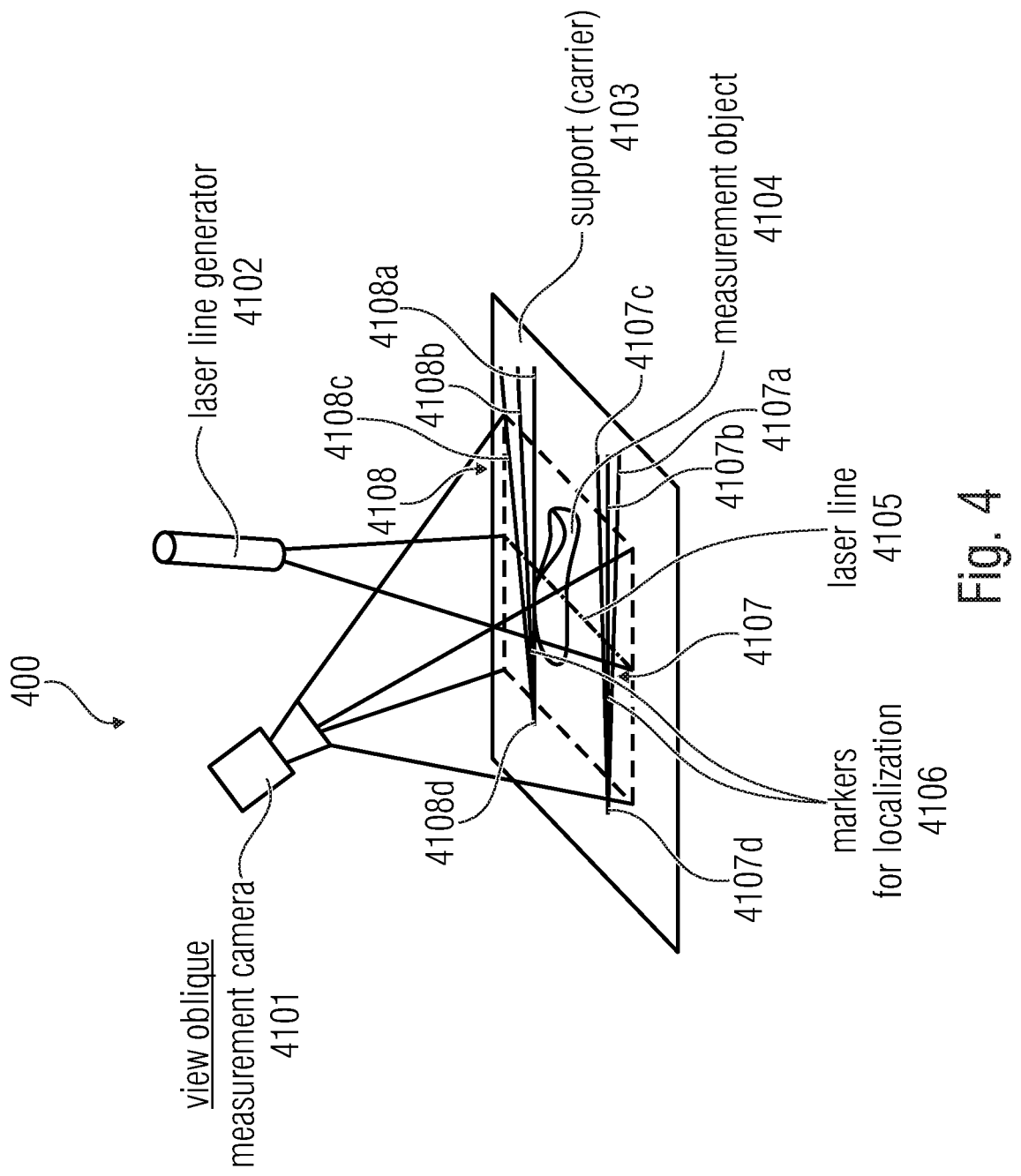
FIG. 4 is a schematic illustration of a structure for localizing a laser line in relation to a measurement object by means of markers on a support (pointer) according to an embodiment of the present invention.

FIG. 4 shows, in the form of an oblique image, a schematic representation of an apparatus for three-dimensional measurement of an object. The apparatus includes a measurement camera 4101 that is, for example, arranged or oriented to capture at least part of a support 4103, which can also be referred to as carrier or carrier member and also at least part of a measurement object (for example, an object to be measured). However, the measurement camera 4101 does not have to be arranged in a stationary or fixed guided manner but can also be configured to be essentially freely movable in space.

Further, the apparatus 400 includes a laser line generator 4102 that is, for example, configured and arranged to project a laser line onto the support 4103 and also onto the measurement object 4104. The laser line generator 4102 can, for example, be arranged to scan a specific angular range in a plane with a laser beam or sweep it periodically and in that way to cover a previous angular range within a plane, for example at a sufficient repetition frequency. While the laser lines generated by the laser line generator 4102 are hardly detectable in clear air due to lack of scattering bodies, the laser line generator typically generates a visible "laser line" that can be captured by the measurement camera 4101 when the laser beam impinges on objects. In an area where the laser beam generated by the laser line generator impinges on the support 4103, the laser line 4105 is essentially straight when it is assumed that the support 4103 is essentially planar. As soon as the support 4103 comprises three-dimensional structures, the same are reflected naturally, depending on an angle of incidence of the laser beam, in deformations of the laser line 4105. Where the laser beam of the laser line generator 4102 impinges on the object to be measured 4104, the laser line follows the contour of the object to be measured 4104 and is hence accordingly deformed or bent in a common three-dimensional measurement object 4104 that is not flat.

The support 4103 typically includes a plurality of markers 4106 for localization that are typically (but not necessarily) formed by straight lines. As can be seen in FIG. 4, there is, for example, a first set 4107 of straight lines including a first line 4107a, a second line 4107b and a third line 4107c. The first line 4107a, the second line 4107b and the third line 4107c advantageously but not necessarily intersect in a first intersection 4107d. Further, there is a second set 4108 of three lines 4108a, 4108b, 4108c that are, for example, straight and that pass, for example through a common point 4108d. In that regard, it should be noted that also a different number of lines or a different geometry of the lines is possible.

The lines 4107a, 4107b, 4108a, 4108b, 4108c, can be mounted, for example, in a fixed manner to the support 4103. Depending on the embodiment, the lines can also be drawn on the support, or the lines can also be deposited as three-dimensional contours on the support. The lines are to be configured such that an intersection of the laser line 4105 with the lines 4107a, 4107b, 4107c, 4108a, 4108b, 1408c can be detected clearly and precisely by the measurement camera 4101. For example, the lines can be configured such that the intersections of the laser line 4105 with the lines 4107a, 4107b, 4107c, 4108a, 4108b, 1408c appear as particularly bright or as particularly dark parts in an image captured by the measurement camera 4101.

With respect to the position and arrangement of the lines, it should be noted that the same are all in one plane that corresponds to a plane of the support 4103. Advantageously, at least four lines exist, wherein a separation into two sets of lines is not mandatory (but contributes to an improvement of the accuracy in some embodiments). Further, it is also not needed that the lines or a subset of the lines pass through a common intersection. However, it has shown that it is advantageous when not all lines are parallel to one another. Concerning the position of the lines, it is advantageous that the same are arranged such that a system of equations described below can be uniquely solved (wherein overdetermination of the system of equations is typically uncritical, since the same can be used, for example, by using a method for minimizing square errors and hence for an improvement of accuracy).

In the following, the arrangement according to FIG. 4 will be discussed again in a top view. FIG. 5 shows such a top view of arrangement 400, wherein some further details will be described. It can again be seen that the support 4103 exists, that carries, for example, an object to be measured 4104. It can also be seen that a laser line 4105 generated by the laser line generator 4102 has an essentially straight course along the surface of the support 4103. Further, markers 4106 can be seen comprising, for example six lines 4107a, 4107b, 4107c, 4108a, 4108b, 4108c. Further, it can be seen in FIG. 5 that the laser line 4105 comprises six intersections with the six lines 4107a-4108c. The intersections are indicated by 4109a, 4109b, 4109c, 4110a, 4110b, 4110c.

Further, it should be noted that a coordinate system 4201 fixed to the support can be associated with the support 4103. However, the coordinate system does not have to be shown explicitly on the support 4103. The coordinate system 4201 fixed to the support comprises, for example, a first coordinate direction 4201a (e.g., x-direction) and a second coordinate direction 4201b (e.g., y-direction).

Further, it should be noted that the position of the lines 4107a, 4107b, 4107c, 4108a, 4108b, 4108c in the coordinate system 4201 fixed to the support should be known. For example, the lines can be described by parameters $n_i$ and $r_i$ of an vectorial coordinate equation $n_i^T x = r_i$, wherein then all points with the coordinate vector x fulfilling the stated coordinate equation are part of the line.

Thus, for example, for each of the lines 4107a, 4107b, 4107c, 4108a, 4108b, 4108c, a respectively allocated normal vector $n_i$ and a respectively allocated scalar parameter $r_i$ are known. The line parameters $n_i$, $r_i$, can, for example, be system constants. The line parameters can, for example, also be allocated differently to different supports 4103. For example, the line parameters $n_i$, $r_i$ can be described by information representation allocated to the support 4103. For example, the support 4103 can comprise a barcode 4207 describing the line parameters $r_i$ and $n_i$ of the lines 4107a, 4107b, 4107c, 4108a, 4108b, 4108c existing on the support 4103. The apparatus can, for example, be configured to read out the bar code on the carrier 4103 to derive the line parameters $n_i$, $r_i$, therefrom.

Further, it should be noted that also a coordinate system fixed to the laser line 4203 can be defined that can be defined, for example, by a coordinate origin $P_0$ and a direction vector s. In that regard, it should be noted that the coordinate origin $P_0$ and the direction vector s can be determined, for example in the coordinate system fixed to the support 4201. The position of the coordinate system fixed to the laser line 4203 with respect to the coordinate system fixed to the support 4201 is typically not known initially (prior to the evaluation of the system of equations explained below), such that $p_0$ and s are to be considered as unknowns at first.

In summary, it is to be stated that FIG. 4 shows a structure for localizing a laser line in relation to a measurement object by means of markers on the support (carrier).

Figure 5:
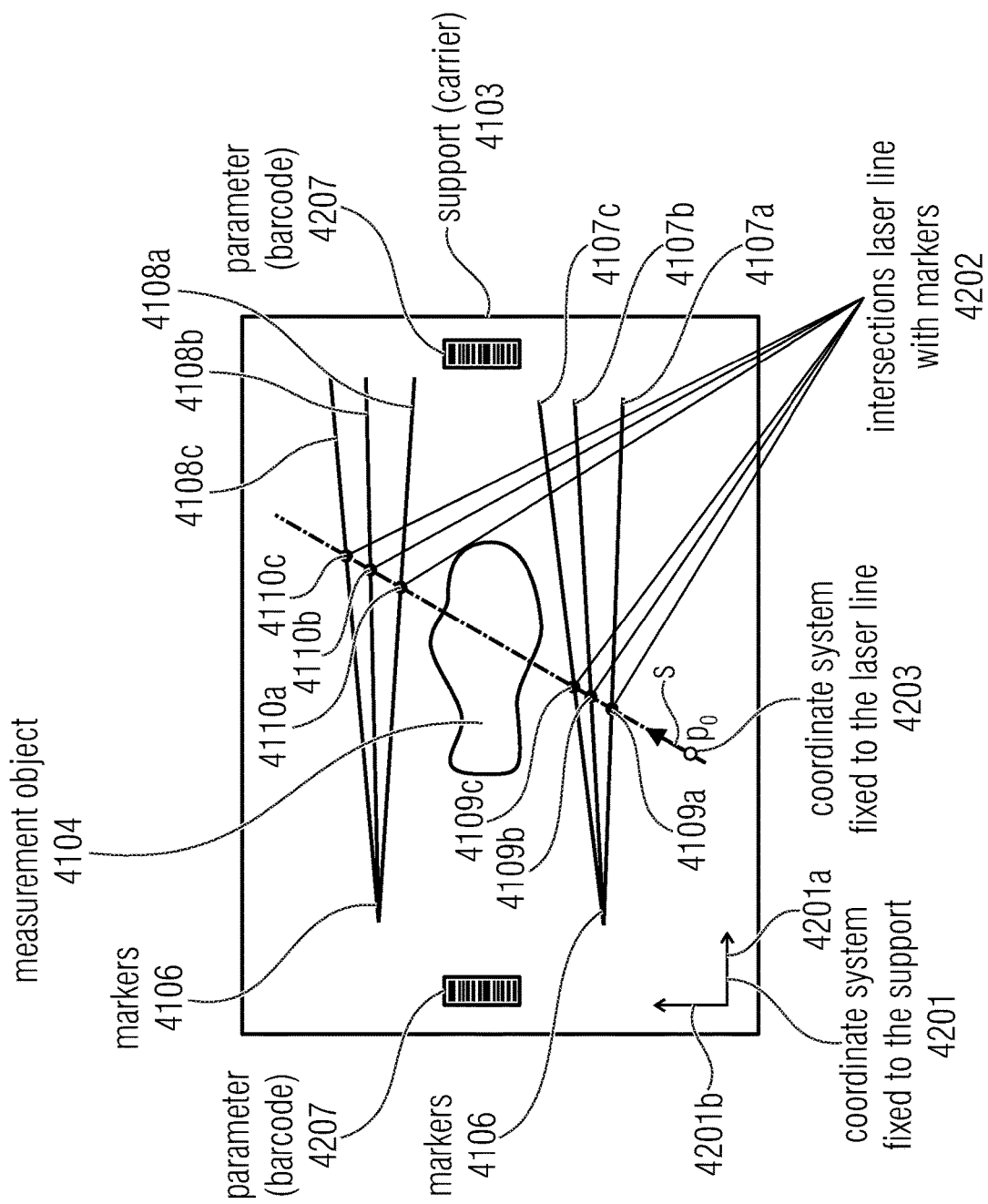
FIG. 5 is a schematic illustration of an arrangement and evaluation of markers on the support according to an embodiment of the present invention.

The localization can be explained in more detail based on FIG. 4 (also based on FIG. 5). The localization of the laser line in the coordinate system (e.g., in the coordinate system fixed to the support 4201) can be performed in that the measurement object is firmly connected to a carrier or rests on the same, wherein the carrier and/or the measurement object include one or several suitable markers. The carrier (and/or the measurement object) is now illuminated with a laser line (for example, generated by the laser line generator 4102), which is again monitored by a measurement camera (for example by the measurement camera 4101).

The geometrical parameters of the markers are predetermined, for example, manually or in a machine-readable manner (e.g., by means of barcode 4207). In other words, information on the position of the (marker) lines 4107a, 4107b, 4107c, 4108a, 4108b, 4108c can be input manually into the apparatus (or the positioning unit) or the information on the position of the (marker) lines can be electronically input by the apparatus (or the positioning unit), for example, by detecting the information included in the bar code.

Further, the concept includes scanning the markers (e.g., the marker lines). For example, scanning the side markers 4106 for accurate localization of the LL line (e.g., the laser line 4105) can be performed in relation to the support 4103.

Scanning the measurement object 4104 lying there between (e.g., between the first group 4107 of lines and the second group 4108 of lines) is performed. Here, uniqueness is advantageous. When uniqueness prevails, there is the option of allocating angle and shift of the laser line in relation to the markers.

In other words, lines 4107a, 4107b, 4107c, 4108a, 4108b, 4108c are arranged such that the measurement object 4104 lies (or can lie) between at least two of the lines, advantageously without shading any line with respect to the laser line generator 4102 or with respect to the measurement camera 4101. Further, the lines are arranged such that the position of the laser line 4105 relative to the lines 4107a-4107c, 4108a-4108c or relative to the coordinate system fixed to the support 4201 can be inferred from the intersections 4109a-4109c, 4110a-4110c between the projected line (laser line) and the lines 4107a-4107c, 4108a-4108c. For that purpose, the lines are to be selected such that the system of equations described below is not underdetermined.

In the following, details concerning the determination of the position of the laser line in relation to the support with the markers will be described. In that regard, reference is made to FIGS. 5 and 6.

FIG. 6 shows a schematic representation of image information as captured, for example, by the measurement camera 4101 as well as subsequent image processing by a positioning unit according to an embodiment of the invention.

The image information 610 as captured by the measurement camera 4101 allows, for example, the identification of intersections of the laser line with markers on the support 4103. For example, a first intersection 4109a, a second intersection 4109b, a third intersection 4109c and a fourth intersection 4110a can be seen. These intersections between the laser line and the lines 4107a, 4107b, 4108c, 4108a on the support 4103 can be detected, for example, by simple image processing (of the positioning unit) when the intersections exist, for example, as particularly bright points in the image information provided by the measurement camera 4101. Alternatively, the intersections 4109a, 4109b, 4109c, 4110a can be identified, for example as particularly dark positions along the laser line or as particularly broad or narrow portions along the laser line in the image information provided by the measurement camera 4101, depending on the technology by which the lines 4107a, 4107b, 4107c etc. are marked on the support. Here, it is merely important that the images of the intersections 4109a, 4109b, 4109c, 4110a can be identified with as little effort as possible in the image information provided by the measurement camera.

Thus, for example, the coordinates of the images of the intersections 4109a, 4109b, 4109c, 4110a in the image information can be determined by a comparatively simple image evaluation. For example, the intersections can be described by two-dimensional coordinates, for example by an x-coordinate and a y-coordinate (for example in an image coordinate system).

Thus, based on the image information provided by the measurement camera (by the positioning unit) a regression line can be identified that passes through the images of the intersections 4109a, 4109b, 4109c, 4110a or that passes such that a sum of squares of the distance of the images of the intersections 4109a-4110a is minimized by the regression line. The regression line is indicated, for example, by 620. In this regard, it should be noted that not necessarily a real regression line has to be determined. Rather, any method for identifying a straight line that passes at least approximately through the images of the intersections can be used.

A direction of the regression line can be described, for example, by a vector s that is, for example, a unit vector. Further, in a coordinate system of the image information, a coordinate origin on the regression line can be selected by the intersections. The selection of the coordinate origin is essentially arbitrary. However, the coordinate origin should lie on the regression line 620. A selection of the coordinate origin is indicated by $p_0$. Based on the selection of the coordinate origin $p_0$ (which can be made by the positioning unit), the positioning unit determines parameters $k_i$ that characterize the position of the intersections 4109a, 4109b, 4109c, 4110a (also described by vectors $p_1$, $p_2$, $p_3$, $p_4$) that are allocated to the position of the intersections. For example, the parameters $k_i$ can essentially describe a distance of the intersections from the coordinate origin (selected on the regression line), wherein a sign of the parameters $k_i$ can indicate in what direction, seen from the coordinate origin of the regression line, the respective intersection lies. More accurately, the amounts of the parameters $k_i$ can describe the distance of the intersections from the coordinate origin. For example, the parameters $k_i$ can be selected such that the equations $p_i = p_0 + k_i s$ are fulfilled in the best way (e.g., in the sense of a smallest possible error if the respective intersections do not lie exactly on the (regression) line).

In summary, it is to be stated that the positioning unit evaluates image information and determines, at first, a position of intersections. Then, the positioning unit determines a straight line or a regression line through the intersections and determines a direction vector of the straight line or regression line. Then, the positioning unit selects, for example arbitrarily or based on a predetermined rule, a point on the straight line or regression line as coordinate origin of a "coordinate system fixed to the laser line" 4203. Subsequently, the positioning unit determines the parameters $k_i$, for example based on the above stated vectorial equation.

Subsequently, the positioning unit determines a position of $P_0$ (i.e., the coordinate origin of the coordinate system fixed to the laser line) and a direction s (i.e., a direction of the coordinate system fixed to the laser line) in the coordinate system of the lines of predetermined or known position (also in the coordinate system fixed to the support 4201).

The determination of the position of $P_0$ and s in the coordinate system of the lines of predetermined or known position will be discussed in more detail below based on a system of equations.

In the following, further details with respect to the determination of the position of the laser line in relation to the support with the markers will be explained. The concepts described below can be used individually or in connection with the further aspects described herein.

In this regard, FIG. 5 shows an arrangement as well as the evaluation of markers on the support. An important aspect of the invention (in particular of positioning) relates to the determination of intersections between the laser line (or the projected line) 4105 and markers 106. In this regard, reference is made to FIG. 5.

The determination of intersections allows a determination of the shift and rotation of the laser line 4105 in relation to the support 4102. Here, in the moved scan, the output of a profile (for example of the object to be measured) in a defined (or determined) change of position of the laser line is enabled. For example, the output of a laser line profile is possible together with position parameters. In that way, start and end points of the laser line in the coordinate system of the support (or the measurement object) can be output, even when the exact position of the laser line generator 4102 relative to the support 4102 is not determined or fixed based on a mechanical guide. In that way, for example, the positioning unit can output a shift and rotation of the two coordinate systems (i.e., the coordinate system fixed to the laser line 4203 and the coordinate system fixed to the support 4201) with respect to one another. For example, the positioning unit can also output the intersections between the laser line and the markers for common evaluation with a height profile (that can be obtained by further image evaluation and describes, for example, a profile of the measurement object).

In the following, further details with respect to the localization algorithm will be described, which can be used, for example, separately or in connection with the statements made based on FIG. 6.

The position of the laser line 4105 is determined relative to a coordinate system fixed to the support 4201 in that the coordinate origin $p_0$ and a unit vector s of a coordinate system fixed to the laser line 4203 is calculated. For this, the markers 4106 (for example lines 4107a, 4107b, 4107c, 4108a, 4108b, 4108c) are at least four straight lines deposited on the support 4103 forming at least four suitable intersections 4202, 4109a, 4109b, 4109c, 4110a, 4110b, 4110c with the laser line 4105 on the support. At least four of said intersections 4202, 4109a, 4109b, 4109c, 4110a, 4110b, 4110c are detected along the laser line 4105 (for example by the positioning unit in an image provided by the measurement camera 4101) and localized in the coordinate system fixed to the laser line 4203 and represented in the form $p_i = p_0 + k_i s$ ($i \in N$, $\forall i : k_i \in \mathbb{R}$). For that purpose, for example, as auxiliary quantities $p_0$ in a coordinate system of the image information and s in a coordinate system of the image information can be determined (wherein it is assumed that the image information shows an essentially undistorted image of the support 4103 and the intersections between the laser line 4105 and the markers 4202. Further, for example, the parameters $k_i$ can be determined by the positioning unit and can be provided for further calculation. In the coordinate system fixed to the support 4201, the marking lines 4106 (e.g., straight lines 4107a, 4107b, 4107c, 4108a, 4108b, 4108c) allocated to these intersections are described by an equation of the form $n_i^T p = r_i$ ($i \in \mathbb{N}$), wherein the constants $n_i$ and $r_i$ are for example input manually (in the positioning unit or in the superordinate apparatus) or are determined based on parameters or barcodes 4107.

The coordinate origin $P_0$ and the unit vector s (for example in the coordinate system fixed to the support 4201 are determined as least squares solution (or least square error solution) of the linear system of equations $$\begin{bmatrix} n_1^T & k_1 n_1^T \\ \vdots & \vdots \\ n_i^T & k_i n_i^T \\ \vdots & \vdots \\ n_N^T & k_N n_N^T \end{bmatrix} \begin{bmatrix} p_0 \\ s \end{bmatrix} = \begin{bmatrix} r_1 \\ \vdots \\ r_i \\ \vdots \\ r_N \end{bmatrix},$$

wherein N>4 straight lines 4106 and intersections 4202 are used (overdetermined system of equations). However, in some embodiments, a usage of N=4 straight lines and intersections can be sufficient.

Optionally, the system of equations is only solved for a subset of the intersections 4202 of the laser line 4105 and the marker 4106. Optionally, each subset is selected such that only intersections 4202 that are not covered by the measurement object 4104 are used. Optionally, said subset is selected such that only intersections that are visible in the image of the measurement camera 4105 are used. Optionally, for each intersection visible in the image of the measurement camera 4101, a detection accuracy is estimated and this detection accuracy is considered when selecting said subset.

Optionally, apart from the least-square solution of said system of equations, also the residuals are determined. Optionally, these residuals are used to perform plausibility checks. Optionally, the residuals are used to decide whether an image of the measurement camera 4101 is discarded (or not).

According to an aspect of the invention, an evaluation of the elevation profile can be performed together with the localization data. For example, an exact position of the laser line 4105 can be determined (e.g. by the positioning unit) in relation to the support and in relation to the measurement object, respectively. Further, performing a coordinate transformation of the elevation data (obtained, for example, based on a laser light section of the measurement object to be measured 4104) into the coordinate system of the markers and the support of the measurement object is enabled. This coordinate transformation can be performed, for example, by the apparatus for measuring a three-dimensional object based on the information obtained from the positioning unit on the position of the projected line, wherein, for example, an elevation profile obtained by further evaluation of the image information from the measurement camera 4104 is allocated to a correct position and a correct course, respectively, according to the information on the position of the projected line. Possibly, interpolation of missing points can be performed within the evaluation of the elevation profile together with the localization data. Optionally, multiple sweep of the surface with the sensor structure for sampling/rastering the surface can be useful. For example, the laser line generator 4102 and/or the measurement camera 4101 can be guided multiple times (e.g., manually or also by a mechanical guidance means) along the object to be measured, wherein during the guidance of the laser line generator 4102 and/or the measurement camera 4101 the position of the laser line 4105 can be determined at different times. In that way, for example, elevation profiles allocated to different positions of the laser line 4101 can be combined to an overall elevation profile of the object to be measured, wherein by multiple guidance of the laser line generator 4102 and/or the measurement camera 4101 along the object to be measured the number of individual elevation profiles is increased, which can again result in an improved resolution of an overall elevation profile.

In summary, it is to be stated that with the concept described based on FIGS. 4, 5 and 6, improved three-dimensional measurement of an object becomes possible. Thus, by the positioning unit described herein, image information (e.g., from the measurement camera 4101) can be used to determine a position of the line projected by the laser line generator 4102 relative to a coordinate system fixed to the support 4201, wherein no mechanical position sensors are needed. Determining the position of the laser line 4105 is performed merely based on a detection of intersections between the laser line 4105 and markers 4202 and is based on processing information describing the position of the intersections in an ideally undistorted image of the support 4103. During processing, the position of markers and lines, respectively, 4106, 4107a, 4107b, 4107c, 4108a, 4108b, 4108c should be known, wherein the positioning unit can obtain the information, for example, via a user interface or via an evaluation of optically or electronically encoded position information.

Information on the position of the laser line 4105 obtained by the positioning unit can then be used in different ways. On the one hand, the information on the position of the laser line 4105 can be used, for example to trigger a measurement output or further detailed evaluation of image information (for example for determining an elevation profile along a laser light section). Alternatively or additionally, the information on the position of the laser line 4105 can also be used to allocate position information to an elevation profile obtained by further detailed evaluation of the image information, for example obtained from the measurement camera. If, for example, the position of the laser line 4105 in the coordinate system fixed to the support 4201 is known, it can be inferred where a laser light section intersects an object to be measured 4104. Thus, it can be determined based on the information on the position of the laser line 4105 (or generally the projected line) where an elevation profile obtained by a laser light section is to be placed within a model of the object to be measured 4104.

5. Apparatus According to FIG. 7

Figure 7:
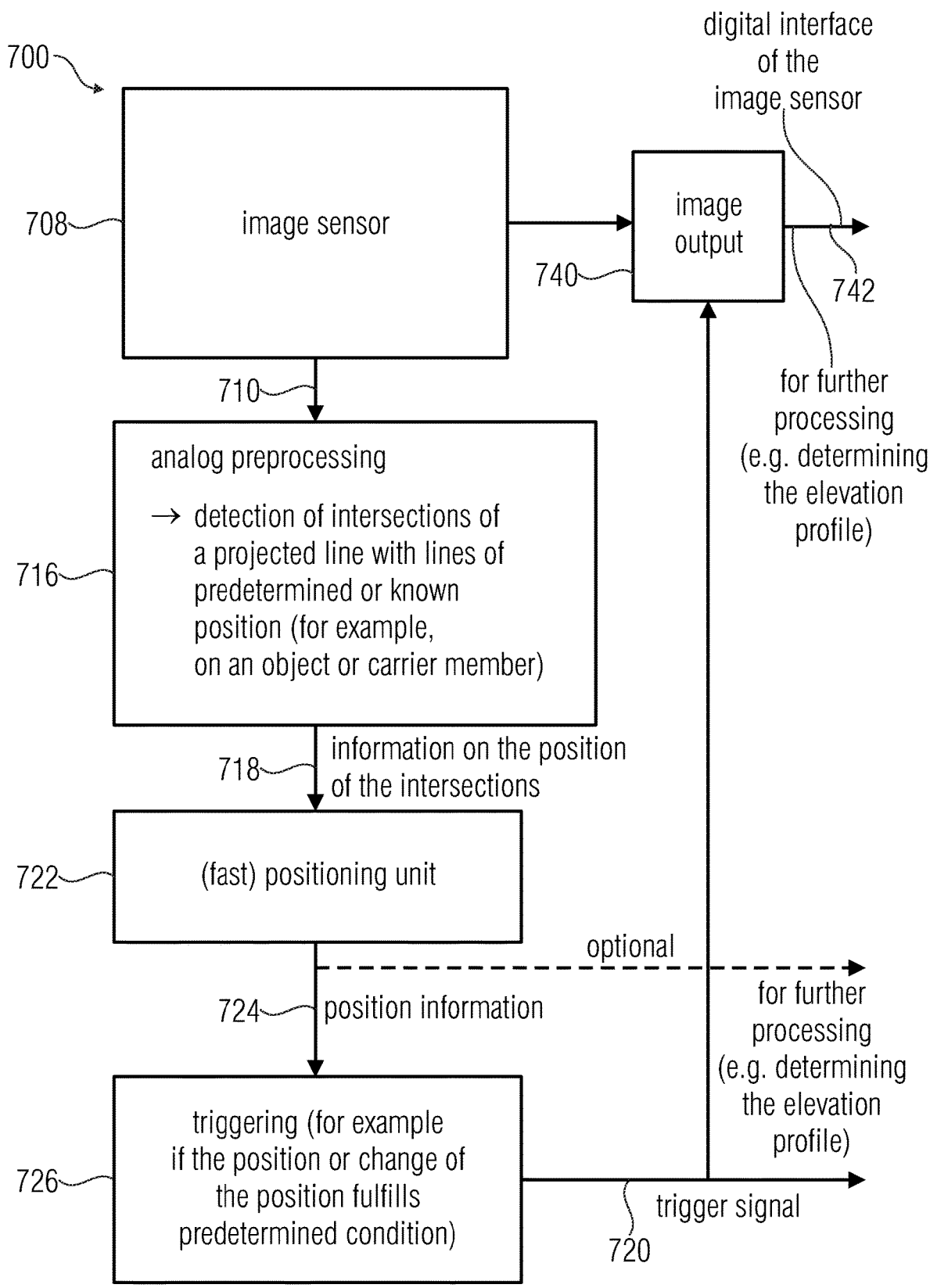
FIG. 7 is a schematic illustration of an apparatus for three-dimensional measurement of an object.

FIG. 7 shows a block diagram of an apparatus for three-dimensional measurement of an object according to an embodiment of the present invention. The apparatus according to FIG. 7 is indicated by 700 in its entirety. The apparatus 700 includes an image sensor 708, that can correspond, for example, to the above-explained image sensor 208. The image sensor provides, for example, an analog image sensor signal 710 that can, for example, correspond to the analog image sensor signal 210, and that can also, for example, correspond to the image information 312. Further, the apparatus 700 includes an analog preprocessing 716 that can be configured, for example, to detect intersections of a projected line with lines of predetermined or known position, for example on an object or a carrier member, and to provide information 718 on a position of the intersections within the image information. Further, the apparatus 700 includes a (fast) positioning unit 722 that is configured, for example, to provide position information 724 based on the information 718 on the position of the intersections in the image information, that describes for example a position of the projected line in relation to a carrier member (support) or in a relation to an object. The analog preprocessing 716 and the (fast) positioning unit 722 can together fulfil the function of the positioning unit 310. Further, the apparatus 700 includes a trigger 726 that is configured to generate a trigger signal 720 when it is detected that the projected line has a specific position (wherein the position of the projected line is described by the position information 724). Here, the trigger signal 720 can correspond, for example, to the trigger signal 220.

All in all, it is to be stated that the analog preprocessing 716, the positioning unit 722 and the trigger 726 can together fulfill the function of analog preprocessing 230, i.e., can generate a trigger signal 720 triggering a measurement output or further detailed processing of image information.

Here, the apparatus 700 includes, for example, an image output 740 that can correspond to the analog digital converter/interface 240 of the apparatus 200. For example, the trigger signal 720 can output an output of image information for further processing, for example for determining an elevation profile.

Additionally, it should be noted that details of further processing are not shown herein. Further processing, for example triggered by the trigger signal 720 or triggered, for example, by outputting image information via the digital interface 742, can generate an elevation profile (e.g., along the laser line or along the laser light section), for example based on the image information provided from the image sensor 708 via the digital interface 742. For example, further processing can also determine a position of the elevation profile based on the position information 724 which can optionally also be provided to the further processing.

Thus, the apparatus 700 in its entirety can trigger further processing (e.g., determining an elevation profile along a laser line or along a laser light section), when an analog preprocessing 716, for example based on analog image sensor signals, detects intersections of a projected line with lines of predetermined or known position and, when for example, position information 724 derived from these intersections indicates that the projected line (laser line) is at a position where an elevation profile is to be generated.

Determining an elevation profile or any other further processing serving for three-dimensional measurement of an object can be triggered, for example, by the trigger signal 720 or can, for example, be triggered merely by outputting digital image information via the digital interface 242 of the image sensor (wherein this output of image information is again triggered by the trigger signal 720).

6. Method According to FIG. 8

Figure 8:
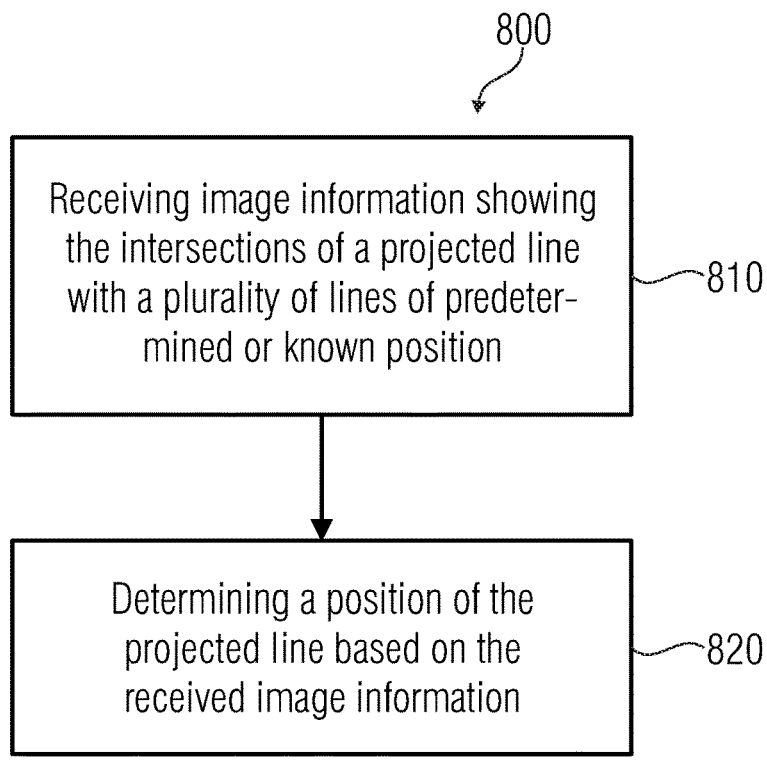
FIG. 8 is a flow diagram of a method according to an embodiment of the present invention.

FIG. 8 shows a flow diagram of a method for three-dimensional measurement of an object. The method 800 includes receiving 810 image information showing intersections of a projected line with a plurality of lines of predetermined and known position, as well as determining 820 a position of the projected line based on the received image information.

The method 800 can be supplemented by all steps, features and functionalities that are described herein, either individually or in combination.

7. Method According to FIG. 9

Figure 9:
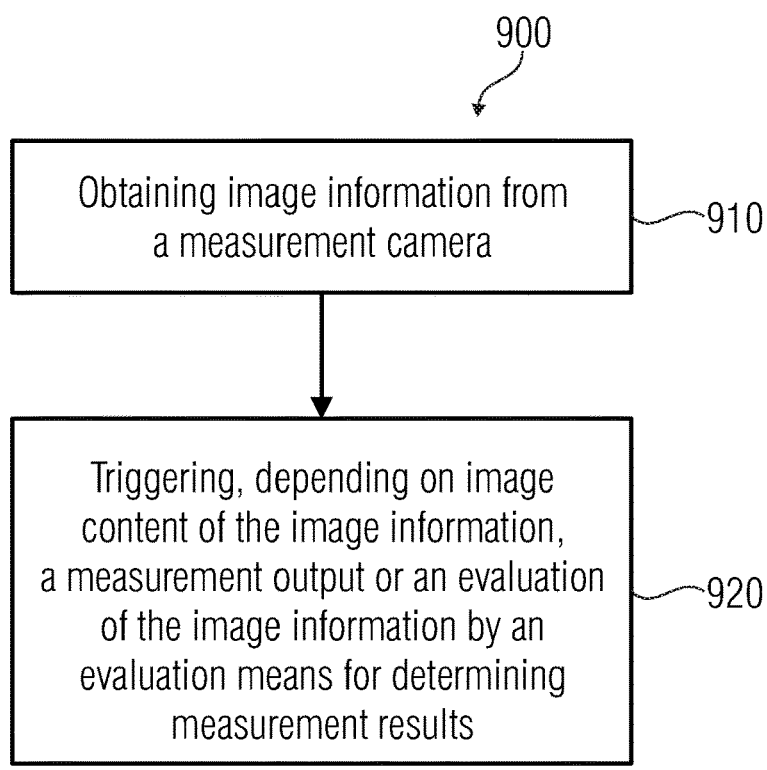
FIG. 9 is a flow diagram of a method according to an embodiment of the present invention.

FIG. 9 shows a flow diagram for a method for three-dimensional measurement of an object. The method 900 according to FIG. 9 includes obtaining 910 image information from a measurement camera and triggering 920, in dependence on image content of the image information, of a measurement output or evaluation of the image information by an evaluation means for determining measurement results.

The method 900 according to FIG. 9 can be supplemented by all steps, features and functionalities that are described herein, either individually or in combination.

8. Applications

In the following, different possible applications of embodiments according to the present invention will be described.

Embodiments according to the present invention can be used, for example, for uncoupled or manual capturing of three-dimensional data (3D data) in specific structures. The application can be performed, for example, in unmovable objects or also objects allowing no scanning by means of incremental encoders (or no movement on a carrier member whose movement can be detected by incremental encoders). This can, for example, be enabled by depositing suitable markers (e.g., the markers 4202) for indicating the position in the coordinate system of the support (e.g., in the coordinate system fixed to the support 4201) and the measurement system, respectively.

Triggering (e.g. triggering based on image information) can be used, for example, for scanning objects in the outdoor area.

Embodiments according to the invention can also be used for measuring rails and roads.

Embodiments according to the invention can also be used detecting and measuring fault locations or specific areas (e.g., of objects to be measured). For example, automatic high precision measurement can be performed as long as an area is within the field of view.

In this regard, it should be noted that markers 202 can be attached, for example, to a surface of an area to be detected or to be measured or adjacent to an area to be detected or to be measured, which then enable a conclusion on a position of a projected line when scanning the area to be detected.

If, for example, a specific area of a wall (or another part of a building) is to be detected, for example, in an environment of the area to be detected, respective markers (e.g., lines or line-shaped markers) can be attached, wherein based on the intersections of the projected line (laser line) with the markers, the position of the projected line (laser line) can be inferred. In that way, a laser scanner generating the laser line can be guided in a relatively free manner and it can still be determined where the projected line runs with respect to the surface to be measured.

Further, triggering the measurement output or the further processing based on a typically simple image evaluation can open up the possibility of generating elevation profiles even when an exact guidance (for example with a known relative movement between laser line generator and object to be measured) cannot be ensured, or when it is impossible or too expensive to detect such relative movement by mechanical sensors.

Thus, embodiments according to the invention allow arbitrary positioning of a laser line (or a projected line) across a measurement object enabling free-hand scanning.

Embodiments according to the invention enable an independence of position encoders.

Thus, embodiments according to the invention allow an optimum resolution depending on the scanning task and surface/structure of the measurement object.

9. Further Aspects

In the following, further aspects according to the invention will be described that can be used individually or in combination with the other aspects illustrated herein.

Embodiments according to the invention can completely or partly solve several of the following objects:
  arbitrary positioning of the laser line over the measurement object—free-hand scanning
  independence of position encoders
  optimum resolution depending on the scanning task and surface/structure of the measurement object 9.1 Solution Ideas (Applicable Individually or in a Combined Manner)

9.1.1 Triggering

The inventive solution for triggering image capturing differs from conventional technology in that no electric coupling between advance of the measurement object and measurement system, e.g., by incremental encoders or timer for a fixed time interval exists. Triggering a measurement output from the measurement camera is merely performed by the image content. This means that the measurement system permanently performs image analysis based on suitable features and only when specific predefined criteria are fulfilled, an image is output, i.e. outputs a self-triggered measurement result when seen from the outside.

Here, the following features for detecting a picture can be selected:
  Laser light section
    3D marks on the surface of the support where the measurement object resides; and/or
    2D optical characteristics along the laser line
      change of the reflectance; and/or
      change of the volume scattering; and/or
      color terms; and/or
    general features from the processing chain within the measurement camera
      reliability of the detected line; and/or
      local width of the laser line; and/or
  Gray image and advance correlation
    with or without planar illumination; and/or
    optical features across a larger area inside or outside the illuminated laser line; and/or
    usage of the 3D stereo reconstruction also for estimation of movement; and/or
    comparison of gray value features in advance direction, e.g. by means of correlation; and/or
    detection of marks and color terms; and/or
  Elevation information—cracks/gaps/scratches
    description of cracks and gaps, e.g. by lacking reflections with specific local extension; and/or
  Capturing from different directions
    when capturing with several cameras or several laser line generators from/into different directions;
    differences in the detected characteristics from different directions; and/or
  Change of polarization
    detection of different materials
    detection of the variation of the penetration depth of the laser beam 9.1.2 Determination of Features (Some or all Concepts can be Used)
  Analysis of the characteristics illustrated in 9.1.1 on the sensor or the downstream processing unit
  Image processing by means of software or specifically developed hardware blocks
  Instantaneous determination of the results without or with very little latency
  Evaluation for deciding whether results are output or the output is suppressed
  Evaluation of different features on the sensor field at different regions of interest
  Usage of the detected characteristics for deciding the position of the evaluated regions of interest
  Controlling the determination of features by an external digital interface for synchronous or asynchronous parameters based on which the triggering is decided.
  Direct output of control signals for the laser line generators and illumination systems for shifting the illumination 9.1.3 Localization 9.1.3.1 General The localization will be discussed in more detail based on FIG. 4. FIG. 4 shows a structure for localization of a laser line in relation to a measurement object by means of markers on the support (carrier). The localization of the laser line in the coordinate system can be performed in that the measurement object is firmly connected to a support or rests on the same which includes one or several suitable markers. If the same is illuminated by a laser line which is again monitored by a measurement camera.

Predetermination of the geometrical parameter of the markers
    manually; and/or
    in a machine-readable manner, e.g. by means of barcode (107)
Scanning the markers
    side markers 106 for exact localization of the LL line in relation to the support and/or
    the measurement object residing in between
    uniqueness is advantageous—option of allocating angle and shift of the laser line in relation to the markers 9.1.3.2 Determination of the Position of the Laser Line with Respect to the Support with the Markers.

Reference is made to FIG. 5. FIG. 5 shows an arrangement and evaluation of markers on the support.

The determination of the position of the laser line includes:
Determining intersections between laser line and markers, see FIG. 5
    determining the shift and rotation of the laser line in relation to the support
    in moved scanning, output of a profile at a defined change of the position of the laser line
    outputting the laser line profile together with position parameters
        e.g. start and end points of the laser line in the coordinate system of the support (the measurement object)
        outputting shift and rotation of the two coordinate systems with respect to one another
        output of the intersections between laser line and markers for common evaluation with the elevation profile
Localization algorithm
The position of the laser line (105) is determined in relation to a coordinate system fixed to the support (201), in that the coordinate origin $p_0$ and a unit vector s of a coordinate system fixed to the laser line (203) is calculated: for this, the markers (106) are at least four straight lines deposited on the support (103) that form at least four suitable intersections (202) with the laser line (105) on the support. At least four of said intersections (202) are detected along the laser line (105) and localized in the laser line fixed coordinate system (203) and illustrated in the form $p_i = p_o + k_i s$, ($i \in \mathbb{N}$, $\forall i : k_i \in \mathbb{R}$). In the coordinate system fixed to the support (201), the marker straight lines (106) allocated to these intersections are described by an equation of the form $n_i^T p = r_i$, ($i \in \mathbb{N}$), wherein the constant $n_i$ and $r_i$ are input manually or are determined based on the parameters/bar codes (107). The coordinate origin $p_0$ and unit vector s are determined as solution or least-square solution of the linear system of equations $$\begin{bmatrix} n_1^T & k_1 n_1^T \\ \vdots & \vdots \\ n_i^T & k_i n_i^T \\ \vdots & \vdots \\ n_N^T & k_N n_N^T \end{bmatrix} \begin{bmatrix} p_0 \\ s \end{bmatrix} = \begin{bmatrix} r_1 \\ \vdots \\ r_i \\ \vdots \\ r_N \end{bmatrix}$$

wherein N>4 straight lines (106) and intersections (202) are used (overdetermined system of equations).

Optionally, the system of equations is only solved for a subset of the intersections (202) of the laser line (105) and the markers (106). Optionally, this subset is selected such that only intersections (202) that are not covered by the measurement object (104) are used. Optionally, said subset is selected such that only intersections that are visible in the image of the measurement camera (101) are used. Optionally, for each intersection visible in the image of the measurement camera (101), a detection accuracy is estimated and this detection accuracy is considered when selecting said subset.

Optionally, apart from the least-square solution of said system of equations, also the residuals are determined. Optionally, these residuals are used for performing plausibility checks. Optionally, the residuals are used for deciding whether an image of the measurement camera (101) is discarded.

Evaluation of the elevation profile together with the localization data
    Determining the exact position of the laser line in relation to the support and the measurement object, respectively
    Performing coordinate transformation of the elevation data in the coordinate system of the markers and the support and the measurement object
    Possibly interpolation of lacking points
    Multiple sweep of the surface with the sensor structure for scanning/rastering the surface 9.1.4 Applications (as Alternatives or in Combination)
Uncoupled or manual capturing of 3D-data in specific structures
    Unmovable objects
    Objects allowing no scanning by means of incremental encoders
        Depositing suitable markers for characterizing the position in the coordinate system of the support or the measurement system
Triggering: scanning objects in the outdoor area
Measuring rails or roads
Detecting and measuring fault locations or specific areas
    Automatic high-precision measurement as long as the area is within the image field.

10. Implementation Alternatives

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps may be performed by a hardware apparatus (or using a hardware apparatus), such as a microprocessor, a programmable computer or an electronic circuit. In some embodiments, some or several of the most important method steps may be performed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may, for example, be stored on a machine readable carrier.

Other embodiments comprise the computer program for performing one of the methods described herein, wherein the computer program is stored on a machine readable carrier.

In other words, an embodiment of the inventive method is, therefore, a computer program comprising a program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein. The data carrier, the digital storage medium, or the computer-readable medium are typically tangible or non-volatile.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment in accordance with the invention includes an apparatus or a system configured to transmit a computer program for performing at least one of the methods described herein to a receiver. The transmission may be electronic or optical, for example. The receiver may be a computer, a mobile device, a memory device or a similar device, for example. The apparatus or the system may include a file server for transmitting the computer program to the receiver, for example.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC.

The apparatuses described herein can be implemented, for example, by using a hardware device or by using a computer or by using a combination of a hardware device and a computer.

The apparatuses described herein or any component of the apparatuses described herein can be at least partly implemented in hardware and/or in software (computer program).

The apparatuses described herein can be implemented, for example, by using a hardware device or by using a computer or by using a combination of a hardware device and a computer.

The apparatuses described herein or any component of the apparatuses described herein can be at least partly implemented in hardware and/or in software (computer program).

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Apparatus for three-dimensional measurement of an object, comprising:
a positioning unit that is configured to receive, from a camera, image information showing intersections of a line whose position is to be determined with a plurality of at least three lines of predetermined or known position that are arranged at or on a carrier member that is configured to carry the measurement object and that lie in one plane and that are not all parallel to one another, and to determine a position of the line based on the received image information;
wherein the positioning unit is configured to define a coordinate origin of a coordinate system allocated to the line whose position is to be determined and a unit section of the coordinate system allocated to the line whose position is to be determined and to determine a plurality of parameters that describe intersections between the line whose position is to be determined and the lines of the plurality of lines of predetermined or known position;
wherein the positioning unit is configured to determine the parameters such that the parameters or amounts of the parameters describe distances of the intersections from the coordinate origin of the coordinate system allocated to the line whose position is to be determined;
wherein the positioning unit is configured to determine a position of the coordinate origin of the coordinate system allocated to the line whose position is to be determined in a coordinate system allocated to the carrier member carrying the lines of predetermined or known position or with respect to which the lines of predetermined or known position are imaged in a stationary manner.

2. Apparatus according to claim 1, wherein the line whose position is to be determined is a projected line.

3. Apparatus according to claim 1, wherein the positioning unit is configured to acquire constants ni, ri that describe the lines of predetermined or known position in a coordinate system in the form $n_i^T p = r_i$.

4. Apparatus according to claim 1, wherein the positioning unit is configured to determine information on the position of the lines of predetermined or known position by using information comprised in a one-dimensional or two-dimensional optical code.

5. Apparatus according to claim 1, wherein the positioning unit is configured to determine parameters ki that describe intersections pi of a whose position is to be determined with the lines of predetermined or known position in a coordinate system allocated to the line whose position is to be determined in the form $p_i = p_0 + k_i s$.

6. Apparatus according to claim 1, wherein the positioning unit is configured to solve a system of equations that combines straight-line equations of the lines of predetermined or known position and a representation of the coordinates of the intersections in a coordinate system allocated to the line whose position is to be determined in order to acquire information on a position of a coordinate origin of the coordinate system allocated to the line whose position is to be determined and information on an orientation of the coordinate system allocated to the line whose position is to be determined.

7. Apparatus according to claim 1, wherein the positioning unit is $$\begin{bmatrix} n_1^T & k_1 n_1^T \\ \vdots & \vdots \\ n_i^T & k_i n_i^T \\ \vdots & \vdots \\ n_N^T & k_N n_N^T \end{bmatrix} \begin{bmatrix} p_0 \\ s \end{bmatrix} = \begin{bmatrix} r_1 \\ \vdots \\ r_i \\ \vdots \\ r_N \end{bmatrix}$$

configured to solve a system of equations of the form exactly or approximately for determining the parameters p0 and s that describe the position of the line whose position is to be determined;
wherein n1 to nN are vectors normal to the lines of predetermined or known position in a coordinate system that is fixed with respect to the lines of predetermined or known position,
wherein r1 to rN are scalar values describing a distance of the lines of predetermined or known position from a coordinate origin of the coordinate system that is fixed with respect to the lines of predetermined or known position, or whose amounts describe a distance of the lines of predetermined or known position from a coordinate origin of the coordinate system that is fixed with respect to the lines of predetermined or known positon,
wherein p0 is a position of an origin of a coordinate system allocated to the line whose position is to be determined in coordinates of the coordinate system that is fixed with respect to the lines of predetermined or known position,
wherein s is a direction of a unit section of the coordinate system allocated to the line whose position is to be determined in coordinates of the coordinate system that is fixed with respect to the lines of predetermined or known position and
wherein k1 to kN describe distances of the intersections from an origin of the coordinate system allocated to the line whose position is to be determined.

8. Apparatus according to claim 1, wherein the apparatus comprises a carrier member that is configured to carry a measurement object and that comprises a plurality of lines of predetermined or known position for the usage by the positioning unit.

9. Apparatus according to claim 8, wherein the carrier member comprises at least four lines of predetermined or known position.

10. Apparatus according to claim 8, wherein the lines of predetermined or known position enclose, in pairs, an angle of at least 2 degrees or wherein a subset of the lines of predetermined or known position encloses, in pairs, an angle of at least 2 degrees.

11. Apparatus according to claim 1, wherein the apparatus comprises a camera for providing the image information and/or a projector for generating a line whose position is to be determined, wherein the camera and/or the projector are movable with respect to a carrier member.

12. Apparatus according to claim 1, wherein the positioning unit is configured to determine a position of the line whose position is to be determined in relation to a carrier member.

13. Apparatus according to claim 1, wherein the positioning unit is configured to fulfill the function of a trigger, wherein the positioning unit is configured to acquire image information from a measurement camera and to trigger, in dependence on image content of the image information, forwarding of the image information to an evaluator for determining measurement results or an evaluation of the image information by an evaluator for determining measurement results of the object.

14. Apparatus according to claim 13, wherein triggering the measurement output is performed exclusively on the basis of the image content.

15. Apparatus according to claim 13, wherein the positioning unit is configured to perform image analysis and to trigger the measurement output or to trigger the evaluation of the image information for determining measurement results of the object in dependence on the image analysis.

16. Apparatus according to claim 1, wherein the positioning unit is configured to analyze image information showing a laser light section and to trigger, based on the analysis, forwarding of the image information or the evaluation of the image information by the evaluator for determining measurement results.

17. Apparatus according to claim 13, wherein the positioning unit is configured to detect, by using a laser light section or another light section, three-dimensional marks on a surface, or two-dimensional optical characteristics along a laser line as features, and to trigger, in dependence on detected features, forwarding of the image information or the evaluation of the image information by the evaluator for determining measurement results.

18. Apparatus according to claim 13, wherein the positioning unit is configured to acquire information on a reliability of line detection or information on a width of a line and to trigger, depending thereon, forwarding of the image information or the evaluation of the image information by the evaluator for determining measurement results.

19. Apparatus according to claim 13, wherein the positioning unit is configured to detect when the image content has shifted with respect to a reference image content by at least one predetermined shift and to trigger, in dependence on detecting a shift, forwarding of the image information or the evaluation of the image information by the evaluator for determining measurement results.

20. Apparatus according to claim 13, wherein the positioning unit is configured to determine or estimate, based on the image content, a movement of a camera generating the image information and/or a shift of a light source irradiating the measurement object and/or a movement of the measurement object, and wherein the positioning unit is configured to trigger, depending on the determination or estimation of the shift, forwarding of the image information or the evaluation of the image information by the evaluator for determining measurement results.

21. Apparatus according to claim 13, wherein the positioning unit is configured to use a three-dimensional reconstruction for motion estimation when analyzing the image content and/or to perform a comparison of gray value features in an advance direction and/or to detect marks and/or to detect color terms.

22. Apparatus according to claim 13, wherein the positioning unit is configured to evaluate, when analyzing the image content, elevation information or surface information.

23. Apparatus according to claim 13, wherein the positioning unit is configured to consider image information that are captured from several different directions.

24. Apparatus according to claim 13, wherein the positioning unit is configured to determine one or several polarization characteristics or a change of one or several polarization characteristics and to trigger, in dependence thereon, forwarding of the image information or the evaluation of the image information by the evaluator for determining measurement results.

25. Apparatus according to claim 13, wherein the positioning unit is configured to decide whether a result is output or the output is suppressed.

26. Apparatus according to claim 13, wherein the positioning unit is configured to analyze different features of the image content and/or wherein the positioning unit is configured to analyze features in different areas of the image content.

27. Apparatus according to claim 13, wherein the positioning unit is configured to generate one or several control signals for one or several laser line generators and/or to generate one or several control signals for one or several illuminators for changing illumination of the measurement object in dependence on an image content of the image information.

28. Apparatus according to claim 13, wherein the positioning unit is configured to detect, based on the image content of the image information, whether a region of interest of the measurement object can be measured or not and to trigger, depending thereon, forwarding of the image information or the evaluation of the image information by the evaluator for determining measurement results.

29. Apparatus according to claim 1, wherein the positioning unit is configured to trigger, in response to detecting a change of a relative position between the projected line and the lines of predetermined or known position, an output or evaluation of a profile.

30. Apparatus according to claim 1, wherein the apparatus is configured to scan a measurement object in a three-dimensional manner without a camera for generating the image information and/or a light source for irradiating the measurement object being guided in a fixed manner, or wherein the camera for generating the image information and/or the light source for irradiating the measurement object are configured for manual guidance.

31. Apparatus according to claim 1, wherein the apparatus is configured to scan an object in the outdoor area, to measure a travel path or to detect a fault location or to measure the same.

32. Method for three-dimensional measurement of an object, comprising:
receiving, from a camera, image information showing intersections of a line whose position is to be determined with a plurality of at least three lines of predetermined or known position that are arranged at or on a carrier member that is configured to carry the measurement object and that lie in one plane and that are not all parallel to one another, and
determining a position of the projected line based on the received image information;
wherein the method comprises defining a coordinate origin of a coordinate system allocated to the line whose position is to be determined and a unit section of the coordinate system allocated to the line whose position is to be determined, and
determining a plurality of parameters that describe intersections between the line whose position is to be determined and the lines of the plurality of lines of predetermined or known position;
wherein the parameters are defined such that the parameters or amounts of the parameters describe distances of the intersections from the coordinate origin of the coordinate system allocated to the line whose position is to be determined;
wherein the method comprises determining a position of the coordinate origin of the coordinate system allocated to the line whose position is to be determined in a coordinate system allocated to the carrier member carrying the lines of predetermined or known position or with respect to which the lines of predetermined or known position are imaged in a stationary manner.

33. A non-transitory digital storage medium having a computer program stored thereon to perform the method for three-dimensional measurement of an object, the method comprising:
receiving, from a camera, image information showing intersections of a line whose position is to be determined with a plurality of at least three lines of predetermined or known position that are arranged at or on a carrier member that is configured to carry the measurement object and that lie in one plane and that are not all parallel to one another, and
determining a position of the projected line based on the received image information;
wherein the method comprises defining a coordinate origin of a coordinate system allocated to the line whose position is to be determined and a unit section of the coordinate system allocated to the line whose position is to be determined, and
determining a plurality of parameters that describe intersections between the line whose position is to be determined and the lines of the plurality of lines of predetermined or known position;
wherein the parameters are defined such that the parameters or amounts of the parameters describe distances of the intersections from the coordinate origin of the coordinate system allocated to the line whose position is to be determined;
wherein the method comprises determining a position of the coordinate origin of the coordinate system allocated to the line whose position is to be determined in a coordinate system allocated to the carrier member carrying the lines of predetermined or known position or with respect to which the lines of predetermined or known position are imaged in a stationary manner,
when said computer program is run by a computer.

34. Apparatus for three-dimensional measurement of an object, comprising:
a positioning unit that is configured to receive, image information showing intersections of a line whose position is to be determined with a plurality of at least three lines of predetermined or known position that lie in one plane and that are not all parallel to one another, and to determine a position of the line based on the received image information;
wherein the positioning unit is configured to define a coordinate origin of a coordinate system allocated to the line whose position is to be determined and a unit section of the coordinate system allocated to the line whose position is to be determined and to determine a plurality of parameters that describe intersections between the line whose position is to be determined and the lines of the plurality of lines of predetermined or known position;

wherein the positioning unit is configured to determine the parameters such that the parameters or amounts of the parameters describe distances of the intersections from the coordinate origin of the coordinate system allocated to the line whose position is to be determined;

wherein the positioning unit is configured to determine a position of the coordinate origin of the coordinate system allocated to the line whose position is to be determined in a coordinate system allocated to a carrier member carrying the lines of predetermined or known position or with respect to which the lines of predetermined or known position are imaged in a stationary manner;

wherein the apparatus comprises the carrier member that is configured to carry a measurement object and that comprises a plurality of lines of predetermined or known position for the usage by the positioning unit; and wherein the apparatus comprises a camera for providing the image information.

* * * * *

UNITED STATES PATENT AND TRADEMARK OFFICE
CERTIFICATE OF CORRECTION

| | | |
|---|---|---|
| PATENT NO. | : 11,287,247 B2 | Page 1 of 1 |
| APPLICATION NO. | : 16/137269 | |
| DATED | : March 29, 2022 | |
| INVENTOR(S) | : Jens Döge et al. | |

It is certified that error appears in the above-identified patent and that said Letters Patent is hereby corrected as shown below:

In the Specification

In Column 2, Line 36: immediately following "allocated to", please delete "a" and substitute therefor --the--.

In the Claims

In Claim 3, Column 34, Line 54: please delete "ni,ri" and substitute therefor --$n_i$, $r_i$--.

In Claim 5, Column 34, Line 63: please delete "ki" and substitute therefor --$k_i$--.

In Claim 5, Column 34, Line 64: please delete "pi" and substitute therefor --$p_i$--.

In Claim 7, Column 35, Line 26: please delete "p0" and substitute therefor --$p_0$--.

In Claim 7, Column 35, Line 28: please delete "n1" and substitute therefor --$n_1$--.

In Claim 7, Column 35, Line 28: please delete "nN" and substitute therefor --$n_N$--.

In Claim 7, Column 35, Line 32: please delete "r1" and substitute therefor --$r_1$--.

In Claim 7, Column 35, Line 32: please delete "rN" and substitute therefor --$r_N$--.

In Claim 7, Column 35, Line 40: please delete "p0" and substitute therefor --$p_0$--.

In Claim 7, Column 35, Line 50: please delete "k1" and substitute therefor --$k_1$--.

In Claim 7, Column 35, Line 50: please delete "kN" and substitute therefor --$k_N$--.

Signed and Sealed this
Twenty-first Day of March, 2023

*Katherine Kelly Vidal*

Katherine Kelly Vidal
*Director of the United States Patent and Trademark Office*